(12) United States Patent
Kinoshita

(10) Patent No.: US 8,025,917 B2
(45) Date of Patent: Sep. 27, 2011

(54) LIQUID MATERIAL DRAWING METHOD, COLOR FILTER MANUFACTURING METHOD, AND ORGANIC EL ELEMENT MANUFACTURING METHOD

(75) Inventor: Toyotaro Kinoshita, Kameyama (JP)

(73) Assignee: Seiko Epson Corporation, Tokyo (JP)

(*) Notice: Subject to any disclaimer, the term of this patent is extended or adjusted under 35 U.S.C. 154(b) by 957 days.

(21) Appl. No.: 11/954,378

(22) Filed: Dec. 12, 2007

(65) Prior Publication Data

US 2008/0152880 A1 Jun. 26, 2008

(30) Foreign Application Priority Data

Dec. 20, 2006 (JP) ................................ 2006-342302

(51) Int. Cl.
*C23C 16/52* (2006.01)
*C23C 18/00* (2006.01)
*B05D 5/12* (2006.01)

(52) U.S. Cl. ............ 427/8; 427/98.4; 427/96.7; 427/64; 427/66

(58) Field of Classification Search ............. 427/8, 96.7, 427/98.4, 64, 66
See application file for complete search history.

(56) References Cited

U.S. PATENT DOCUMENTS

| 6,645,029 B2 * | 11/2003 | Akahira ........................... 445/24 |
| 2004/0233246 A1 * | 11/2004 | Takeushi ........................... 347/19 |
| 2005/0052481 A1 * | 3/2005 | Takahashi et al. ................ 347/8 |

FOREIGN PATENT DOCUMENTS

| JP | 2003048314 A | * | 2/2003 |
| JP | 2003-275650 A | | 9/2003 |
| JP | 2006015243 A | * | 1/2006 |
| JP | 2006-130383 A | | 5/2006 |
| JP | 2006247500 A | * | 9/2006 |

* cited by examiner

*Primary Examiner* — Dah-Wei Yuan
*Assistant Examiner* — Jose Hernandez-Diaz
(74) *Attorney, Agent, or Firm* — Global IP Counselors, LLP

(57) ABSTRACT

A liquid material drawing method includes: performing a first discharging step in which at least one of the droplets the liquid material is discharged from at least one of a plurality of nozzles for each of a plurality of pixel regions; observing and capturing an image of the pixel regions on a workpiece in which the droplets are discharged; computing a distance in a first direction and a distance in an orthogonal second direction between barrier parts on the workpiece and a landing position of the at least one of the droplets in the image of the pixel regions; and correcting arrangement information including a relative positioning of the nozzles and the workpiece, which is used to arrange a prescribed number of the droplets as dots for each of the pixel regions, based on the distance in the first direction and the distance in the second direction.

12 Claims, 17 Drawing Sheets

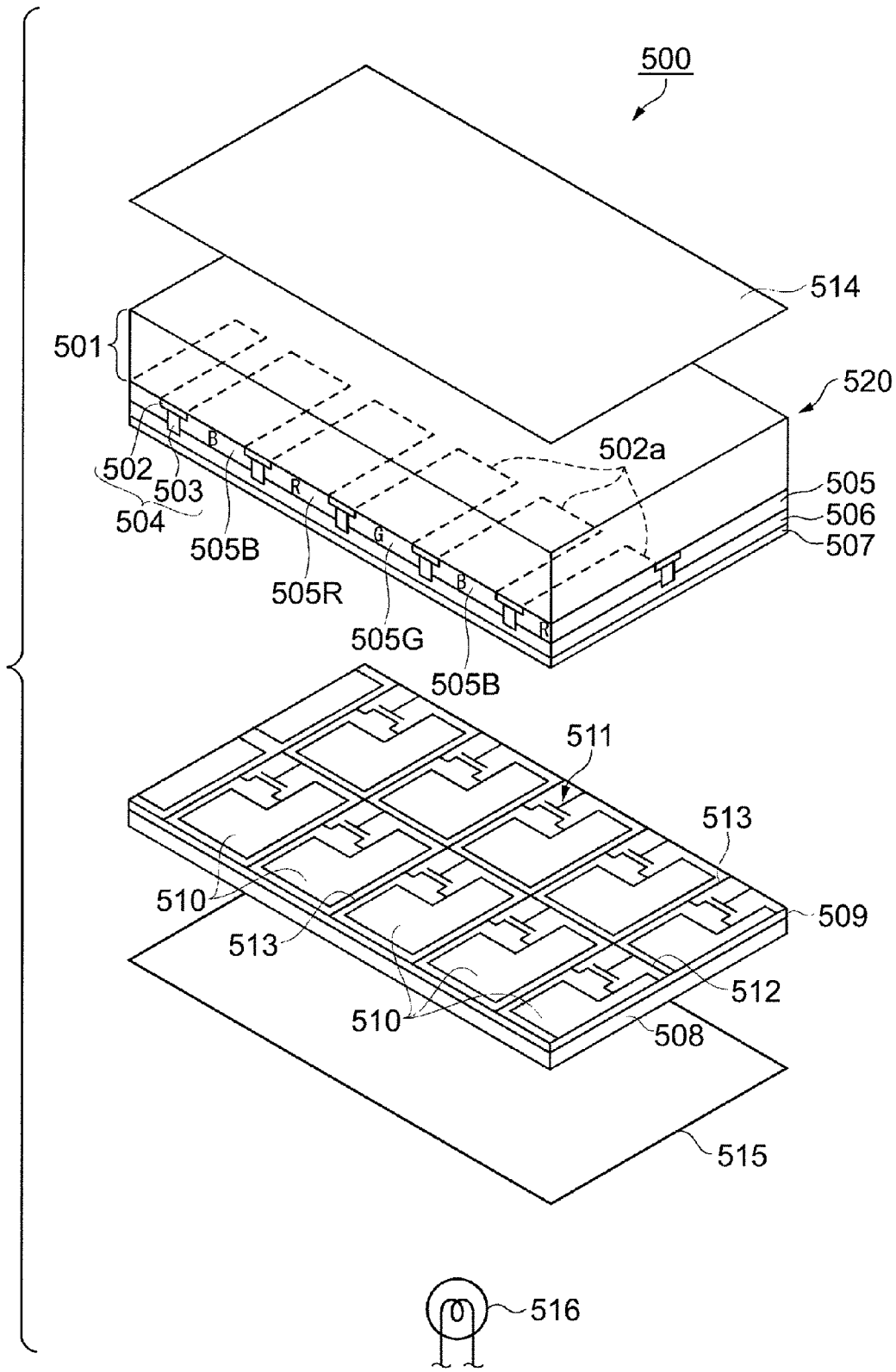
F I G. 7

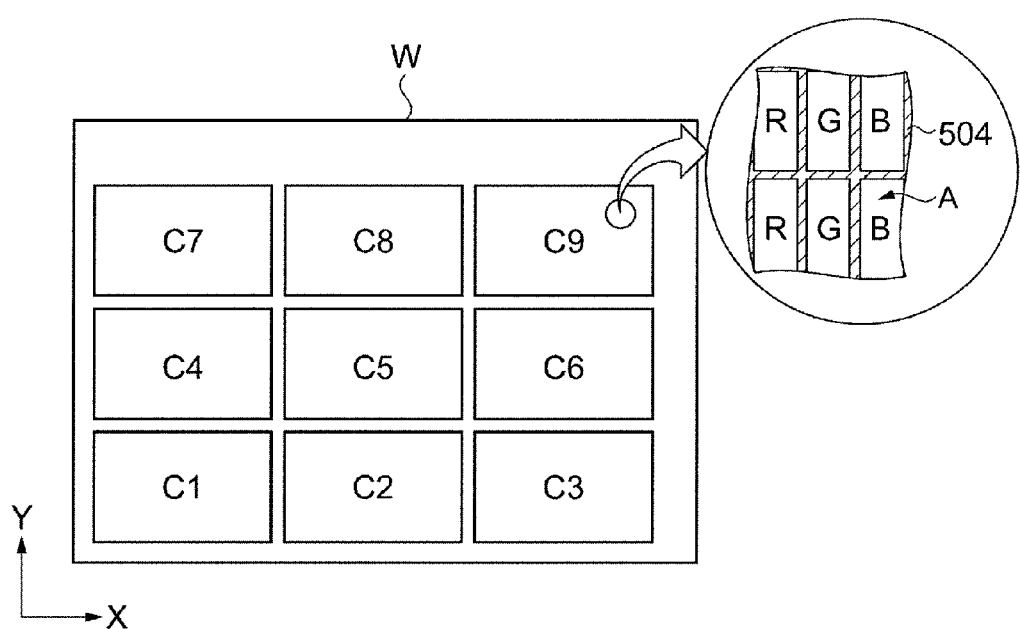
F I G. 8

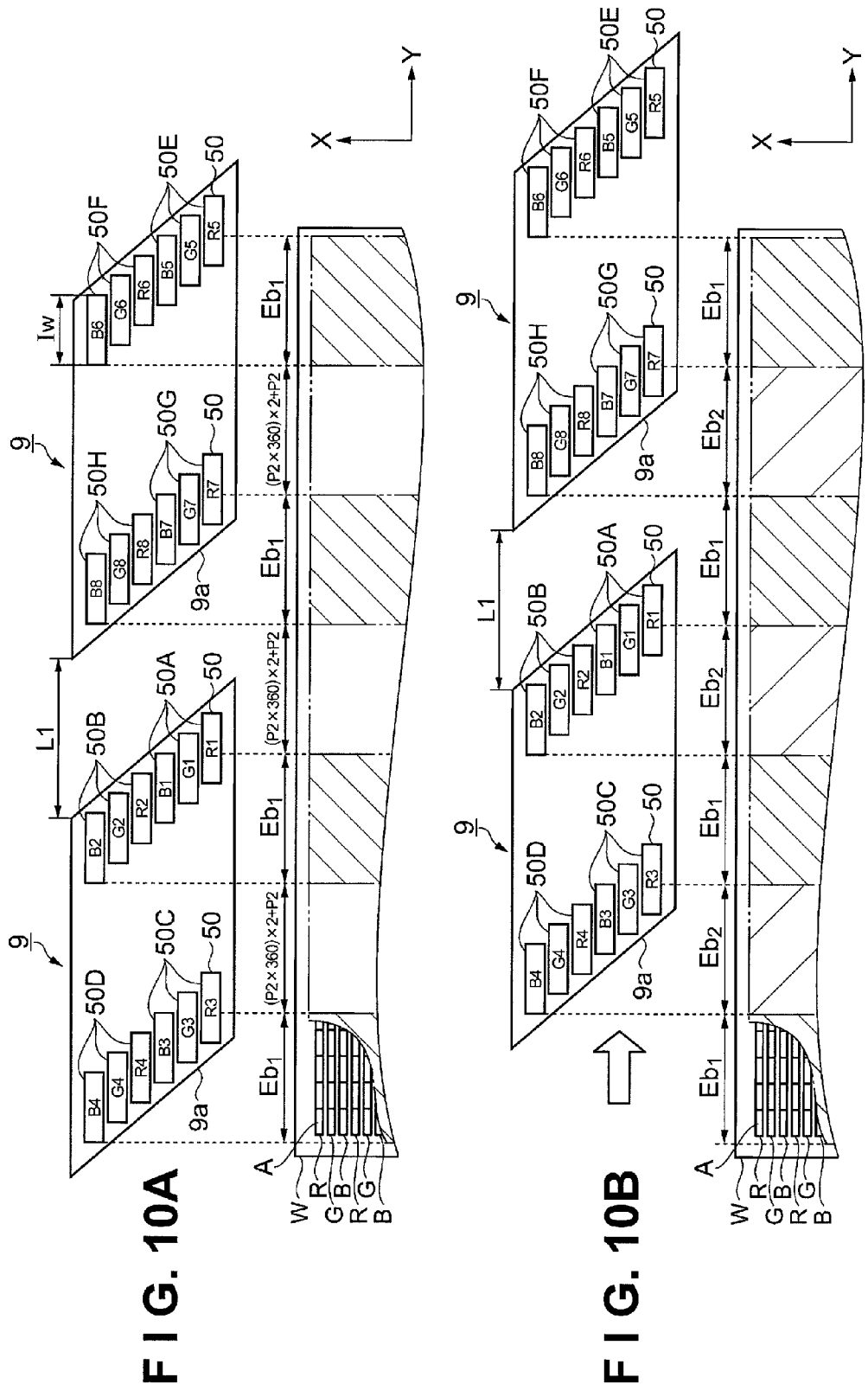

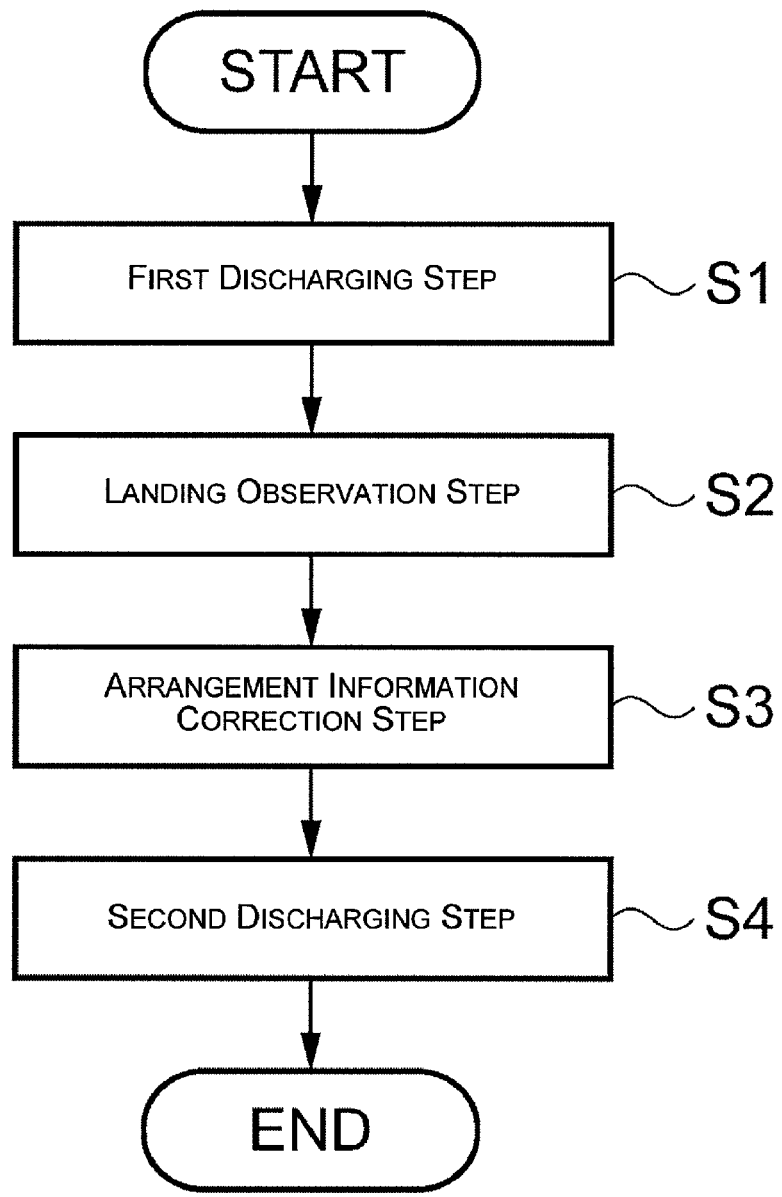
F I G. 11

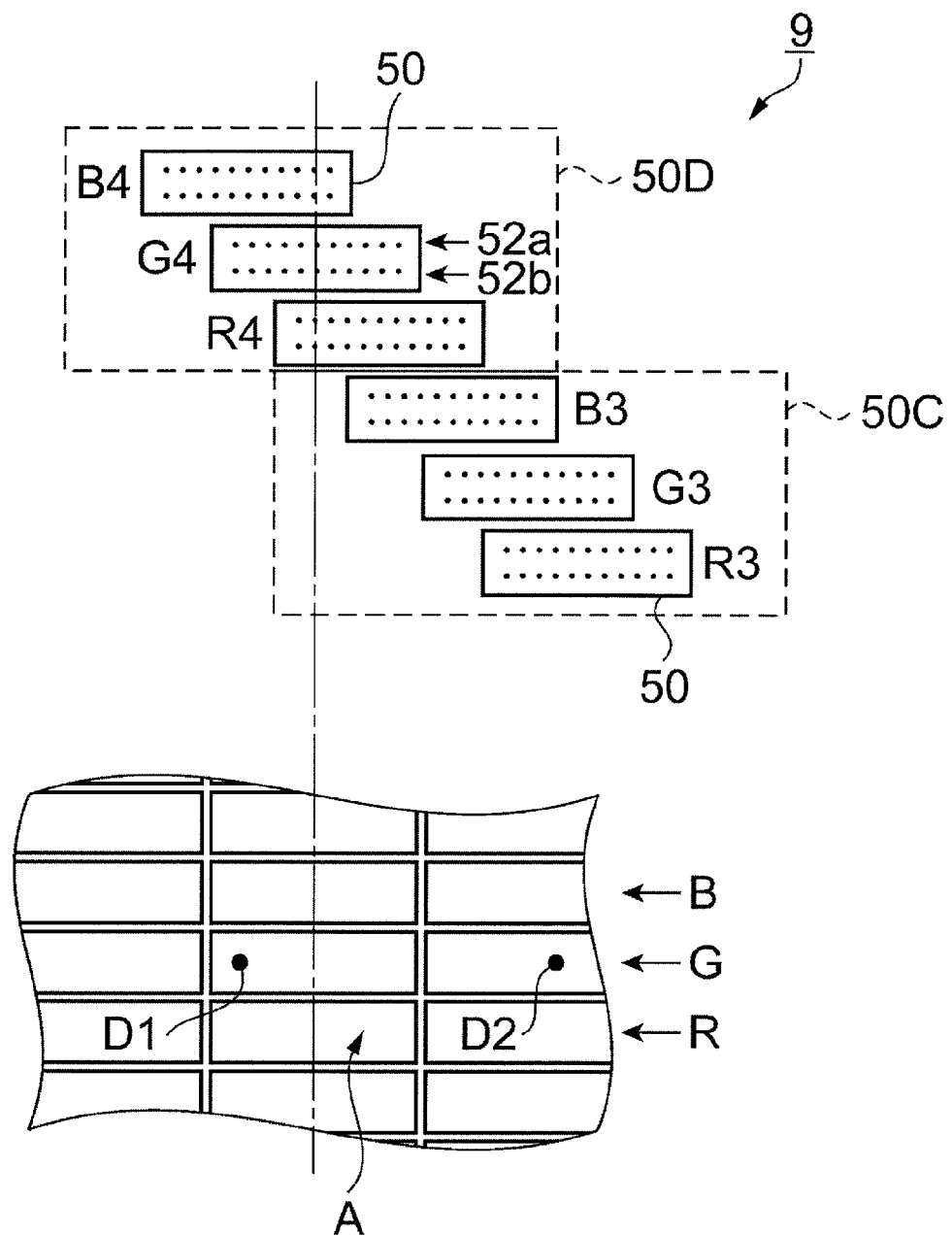
F I G. 13

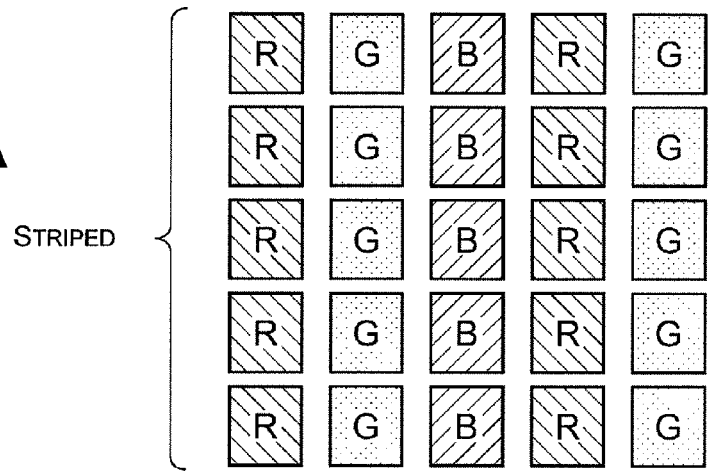
FIG. 17A STRIPED
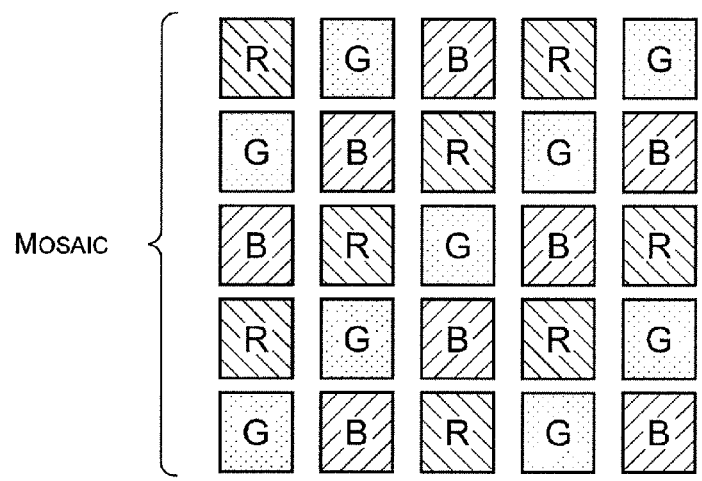
FIG. 17B MOSAIC
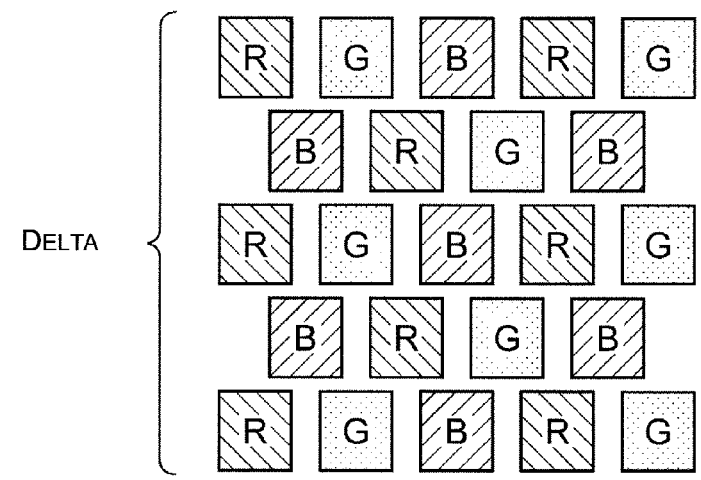
FIG. 17C DELTA

LIQUID MATERIAL DRAWING METHOD, COLOR FILTER MANUFACTURING METHOD, AND ORGANIC EL ELEMENT MANUFACTURING METHOD

CROSS-REFERENCE TO RELATED APPLICATIONS

This application claims priority to Japanese Patent Application No. 2006-342302 filed on Dec. 20, 2006. The entire disclosure of Japanese Patent Application No. 2006-342302 is hereby incorporated herein by reference.

BACKGROUND

1. Technical Field

The present invention relates to a liquid material drawing method that uses a liquid droplet discharge method, to a color filter manufacturing method, and to an organic EL element manufacturing method.

2. Related Art

Japanese Laid-Open Patent Application Publication No. 2003-275650 discloses an example of known drawing systems that use a droplet discharge method include a drawing method (drawing system) for drawing one or more chip-shaped regions on a workpiece by causing functional droplets to be selectively discharged from a plurality of nozzles provided to a functional-droplet discharge head while causing the functional-droplet discharge head to move relative to the workpiece based on data that are stored in a recording medium.

In the abovementioned drawing system, the functional droplets are discharged and drawn on the workpiece based on discharge pattern data of each nozzle that are stored in the recording medium.

The abovementioned discharge pattern data are generated based on at least chip information relating to the position of a chip formation region on the workpiece, pixel information relating to the arrangement of pixels in a chip formation region, and nozzle information relating to the arrangement of the nozzles with respect to the workpiece.

Japanese Laid-Open Patent Application Publication No. 2006-130383 discloses an example of known methods for detecting the landing position of the discharged functional droplets include a dot deviation detection method and a dot deviation detection device capable of simply and rapidly detecting a dot misalignment obtained from the landing of a droplet discharged from a nozzle of the droplet discharge head onto a detection object.

In view of the above, it will be apparent to those skilled in the art from this disclosure that there exists a need for an improved liquid material drawing method, color filter manufacturing method, and organic EL element manufacturing method. This invention addresses this need in the art as well as other needs, which will become apparent to those skilled in the art from this disclosure.

SUMMARY

When a liquid material that includes a functional material is discharged in the form of droplets onto a workpiece to form a film pattern composed of the functional material, the droplets discharged from the nozzles must be landed on the workpiece with good positional accuracy. However, even when the abovementioned drawing methods are used, the droplets may not land in the desired position based on the abovementioned discharge pattern data when there is "deviation" in the relative positioning of the workpiece and the plurality of nozzles in relative movement of the workpiece and the functional droplet discharge head.

The positional accuracy of the plurality of nozzles, movement precision in the abovementioned relative movement, and the like contribute to such "deviation."

The abovementioned dot deviation detection method and dot deviation detection device may be used to adjust or correct such "deviation." However, since droplets are discharged on a detection object other than the workpiece, waste of the liquid material occurs.

The present invention was developed in view of the foregoing problems, and an object of the present invention is to provide a liquid material drawing method capable of preventing waste of the liquid material and landing the droplets with good positional accuracy, to provide a color filter manufacturing method, and to provide an organic EL element manufacturing method.

A liquid material drawing method according to a first aspect of the present invention is a liquid material drawing method for discharging droplets of a liquid material including a functional material from a plurality of nozzles to a plurality of pixel regions that are partitioned by barrier parts in a first direction and a second direction orthogonal to the first direction on a workpiece in synchronization with relative movement of the workpiece and the nozzles in the first direction to form pixel formation elements. The liquid material drawing method includes: performing a first discharging step in which at least one of the droplets is discharged for each of the pixel regions; observing and capturing an image of the pixel regions in which the droplets are discharged; computing a distance in the first direction and a distance in the second direction between the barrier parts and a landing position of the at least one of the droplets in the image of the pixel regions; correcting arrangement information including a relative positioning of the nozzles and the workpiece, which is used to arrange a prescribed number of the droplets as dots for each of the pixel regions, based on the distance in the first direction and the distance in the second direction; and performing a second discharging step in which the droplets are discharged based on the arrangement information corrected.

According to this method, a distance in the first direction and a distance in the second direction between the barrier parts and a landing position of the droplets discharged in the first discharging step are computed in the computation step. Consequently, landing position information of the first direction and the second direction when the droplets are discharged from the plurality of nozzles to the workpiece can be obtained from the measurement results. The landing position accuracy of the droplets reflects the accuracy of the relative positioning of the workpiece and the plurality of nozzles during relative movement. The relative positioning of the workpiece and the plurality of nozzles is thus corrected based on the distance in the first direction and the distance in the second direction in the arrangement information correction step, whereby arrangement information is obtained that reflects the actual landing state of the droplets. The droplets can therefore be landed in the pixel regions with good positional accuracy in the second discharging step. Furthermore, at least one droplet is discharged in a pixel region of the workpiece in the first discharging step instead of discharging droplets onto a discharge object other than the workpiece in order to obtain droplet landing position information, and waste of the liquid material can therefore be prevented. Specifically, a liquid material drawing method can be provided that is capable of preventing waste of the liquid material, and of landing the droplets with good positional accuracy.

In a preferred configuration, the performing of the first discharging step includes discharging the at least one of the droplets on an imaginary center line parallel to the second direction in each of the pixel regions, the imaginary center line being calculated based on the barrier parts in the image of the pixel regions, and the computing of the distance in the first direction includes calculating the imaginary center line based on the barrier parts in the image of the pixel regions, and computing the distance in the first direction between the imaginary center line and the landing position of the at least one of the droplets.

According to this method, a distance in the first direction between the imaginary center line and a landing position of the droplet discharged in the first discharging step is computed in the computation step. Consequently, the distance in the first direction is used to compute the actual amount of deviation in the first direction with respect to the desired landing position. The relative positioning of the plurality of nozzles in the first direction with respect to the work piece can thus be easily corrected based on the computed result.

In a preferred configuration, the performing of the first discharging step includes discharging the at least one of the droplets during a forward movement and during a reverse movement in the relative movement. According to this method, since droplets are discharged in forward movement and in reverse movement in relative movement in the first discharging step, droplet landing position information that corresponds to forward movement and to reverse movement can be obtained in the computation step. Droplets can thus be landed with good positional accuracy in the second discharging step according to forward movement and reverse movement in the relative movement of the workpiece and the plurality of nozzles.

In a preferred configuration, the performing of the first discharging step includes selecting two most distant nozzles among the nozzles that correspond to a same pixel region, and discharging the at least one of the droplets from each of the two nozzles. When the droplets are discharged onto the workpiece, there is a risk of the landed droplets spreading together and combining due to surface tension. The correct landing position is difficult to compute in the computation step when the droplets combine. According to this method, since two droplets are landed at a distance from each other in the pixel region, the droplet landing position information can be stably obtained.

In a preferred configuration, the observing of the pixel regions includes observing the pixel regions over which the nozzles scan through one cycle of the relative movement. According to this method, the landing position information of droplets that correspond to the plurality of nozzles can be efficiently obtained even without observing the landing position of the droplets discharged in all of the pixel regions. In a preferred configuration, the liquid material drawing method further includes setting the prescribed number of the droplets as dots for each of the pixel regions in the arrangement information to a value obtained by subtracting a number of the droplets discharged during the first discharging step from a number obtained by converting to an amount of the liquid material required to be applied to the pixel regions into a number of droplets. According to this method, waste of the liquid material can be furthermore prevented, and the necessary quantity of the liquid material can be applied as droplets in the pixel regions.

In a preferred configuration, the correcting of the arrangement information includes correcting a relative positioning of the workpiece and a plurality of nozzle rows arranged along a direction that intersects the direction of the relative movement based on the distance in the first direction and the distance in the second direction. According to this method, the relative positions of each nozzle row with respect to the workpiece can be corrected in the arrangement information.

In a preferred configuration, the correcting of the arrangement information includes correcting a relative positioning of the workpiece and a plurality of discharge heads with each of the discharge heads having at least one of the nozzles rows based on the distance in the first direction and the distance in the second direction. According to this method, the relative positions of each discharge head with respect to the workpiece can be corrected in the arrangement information.

In a preferred configuration, the correcting of the arrangement information includes correcting a relative positioning of the workpiece and a plurality of head units to which the discharge heads are mounted based on the distance in the first direction and the distance in the second direction. According to this method, the relative positions of each head unit with respect to the workpiece can be corrected in the arrangement information.

In a preferred configuration, the liquid material drawing method further includes generating the arrangement information that includes a discharge timing of an energy generation unit that is used to discharge the droplets from each of the nozzles of the nozzles rows. The correcting of the arrangement information includes varying the discharge timing of the nozzle rows in which landing position deviation occurs based on the distance in the first direction. According to this method, the landing position of droplets in the first direction, i.e., the direction of relative movement, can be corrected for each nozzle row by a soft method involving the discharge timing of the energy generation unit. Consequently, a nozzle row in which landing position deviation occurs can be adjusted more conveniently than when position adjustment is performed by a hard method.

In a preferred configuration, the liquid material drawing method further includes generating the arrangement information that includes a discharge timing of an energy generation unit that is used to discharge the droplets from each of the nozzles of the discharge heads. The correcting of the arrangement information includes varying the discharge timing of the discharge heads in which landing position deviation occurs based on the distance in the first direction. According to this method, the landing position of droplets in the first direction, i.e., the direction of relative movement, can be corrected for each nozzle row by a soft method involving the discharge timing of the energy generation means. Consequently, a nozzle row in which landing position deviation occurs can be adjusted more conveniently than when position adjustment is performed by a hard method.

A color filter manufacturing method according to another aspect of the present invention is a color filter manufacturing method for manufacturing a color filter having at least three colors of color layers in the pixel regions partitioned on the substrate. The color filter manufacturing method includes: performing the liquid material drawing method according to the above aspects of the present invention to discharge and draw at least three colors of the liquid material in the pixel regions with the liquid material including a color layer formation material; and curing the liquid material discharged and drawn on the substrate to form the at least three colors of the color layers.

According to this method, since the liquid material drawing method is used that is capable of preventing waste of the liquid material and landing the droplets with good positional accuracy, the necessary quantity of the liquid material can be applied as droplets in each pixel region, and a color filter having the desired optical characteristics can be manufactured.

In a preferred configuration, the performing of the first discharging step includes discharging the at least one of the droplets of one of the three colors of the liquid material on an imaginary center line parallel to the second direction in the pixel regions in which the one of the three colors of the liquid material is applied. According to this method, since one color of the liquid material is discharged in the first discharging step, a color filter can be manufactured in which waste of the liquid material is furthermore prevented.

An organic EL element manufacturing method according to another aspect of the present invention is an organic EL element manufacturing method for manufacturing an organic EL element having at least a luminescent layer in the pixel regions partitioned on the substrate. The organic EL manufacturing method includes: performing the liquid material drawing method according to claim 1 to discharge and draw the liquid material including a luminescent layer formation material in the pixel regions; and curing the liquid material discharged and drawn on the substrate to form the luminescent layer.

According to this method, since the liquid material drawing method is used that is capable of preventing waste of the liquid material and landing the droplets with good positional accuracy, the necessary quantity of the liquid material can be applied as droplets in each pixel region, and an organic EL element having the desired optical characteristics can be manufactured.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 7 is a schematic exploded perspective view showing the structure of the liquid crystal display device;

FIG. 8 is a schematic plan view showing the motherboard;

FIGS. 10A and 10B are schematic plan views showing the relative positioning of the workpiece and the head unit in the drawing step;

FIG. 11 is a flowchart showing the liquid material drawing method;

FIG. 13 is a schematic plan view showing the landing observation method;

FIGS. 17A through 17C are schematic plan views showing arrangements of pixels.

DETAILED DESCRIPTION OF EXEMPLARY EMBODIMENTS

First Embodiment

An embodiment of the present invention will be described using as an example a method for manufacturing a color filter having colored layers in a plurality of colors in color regions as a plurality of pixel regions on a substrate. The color layers are pixel formation elements that are formed by discharging droplets of a liquid material that includes a color layer forming material as a functional material from a plurality of nozzles to a plurality of color regions.

Figure 1:
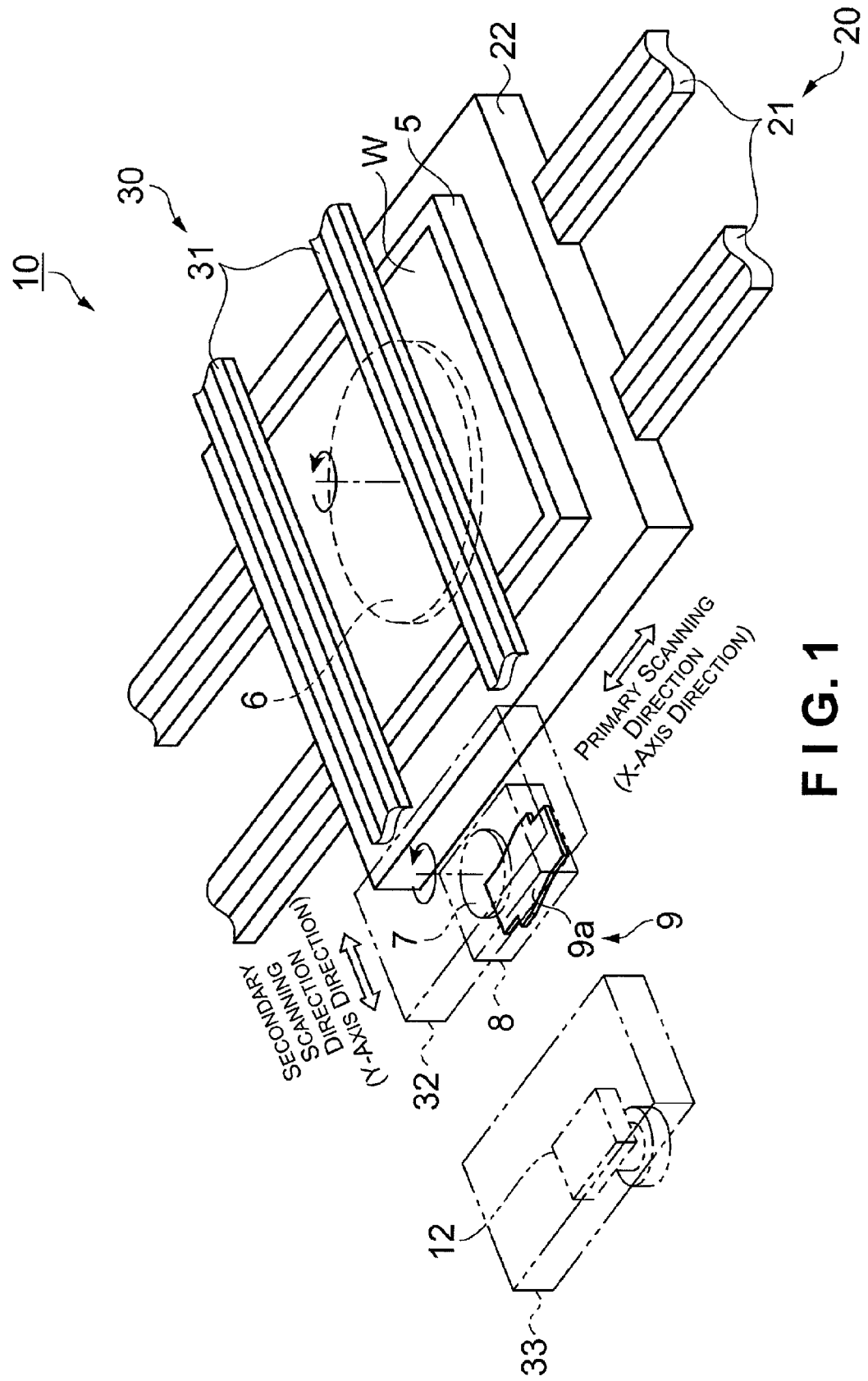
FIG. 1 is a schematic perspective view showing the structure of the droplet discharge device.

A droplet discharge device capable of discharging and drawing the liquid material as droplets will first be described based on FIGS. 1 through 6. FIG. 1 is a schematic perspective view showing the structure of the droplet discharge device.

As shown in FIG. 1, the droplet discharge device 10 is provided with a workpiece movement mechanism 20 for moving a motherboard W as a workpiece in a primary scanning direction (X-axis direction), and a head movement mechanism 30 for moving a droplet discharge head 50 (see FIGS. 2A and 2B) in a secondary scanning direction (Y-axis direction).

The workpiece movement mechanism 20 is provided with a pair of guide rails 21, a movement stage 22 that moves along the pair of guide rails 21, and a setting table 5 for mounting the motherboard W that is attached via a θ table 6 as a rotation mechanism on the movement stage 22. The movement stage 22 is moved in the primary scanning direction through the use of an air slider and a linear motor (not shown) provided inside the guide rails 21. The setting table 5 is configured so as to be capable of attaching and fixing the motherboard W, and a reference axis in the motherboard W can be properly aligned with the primary scanning direction and the secondary scanning direction through the use of the θ table 6.

The head movement mechanism 30 is provided with a pair of guide rails 31, and two movement stages 32, 33 that move along the pair of guide rails 31. The movement stage 32 is provided with a carriage 8 that is attached by suspension via a rotation mechanism 7. The carriage 8 is provided with a head unit 9 in which a plurality of droplet discharge heads 50 is mounted. A liquid material feeding mechanism (not shown) for supplying the liquid material to the droplet discharge heads 50, and a head driver 48 (see FIG. 4) for electrically controlling the driving of the plurality of droplet discharge heads 50 are also provided. The movement stage 32 moves the carriage 8 in the Y-axis direction so that the head unit 9 is positioned facing the motherboard W.

A camera 12 as an imaging mechanism is mounted on the movement stage 33. The camera 12 is provided with a CCD or other imaging element, for example, and is capable of moving in the Y-axis direction through the use of the movement stage 33 so as to observe and image the landing state of the landed droplets on the surface of the motherboard W. An illumination device for illuminating the imaged body may be provided to the movement stage 33 as needed.

Besides the structures described above, a maintenance mechanism for eliminating nozzle obstructions in the plurality of droplet discharge heads 50 mounted in the head unit 9, removing debris or contamination from the nozzle surfaces, and performing other maintenance is provided to the droplet discharge device 10 in a position facing the plurality of droplet discharge heads 50, but is not shown in the drawings.

Figure 2A:
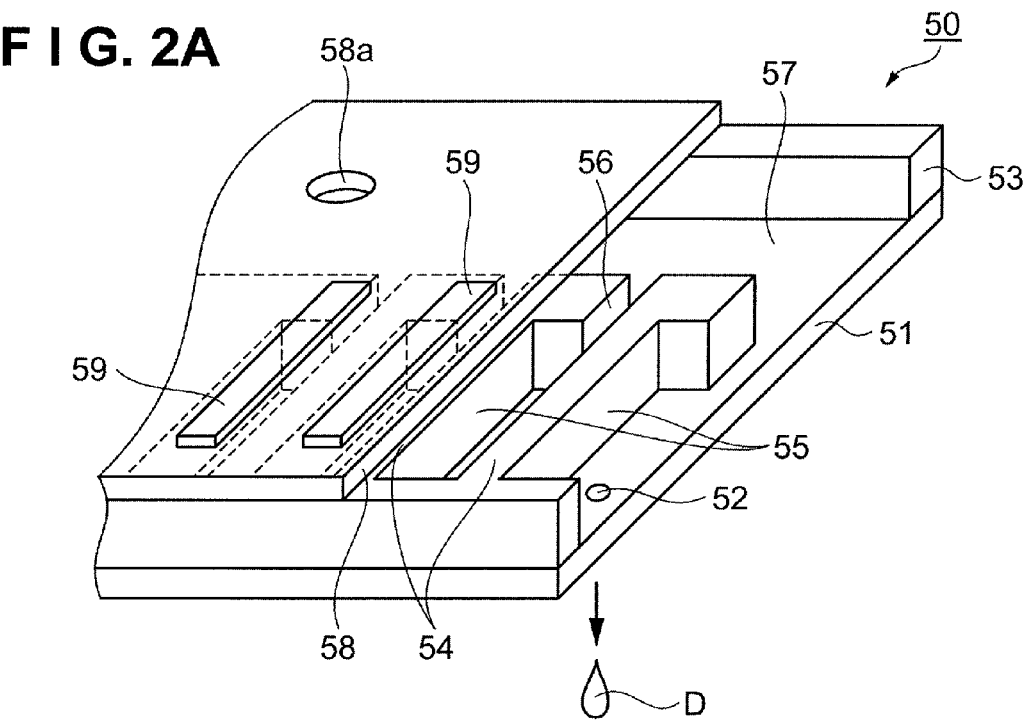
FIGS. 2A and 2B are schematic diagrams showing the structure of a droplet discharge head.
Figure 2B:
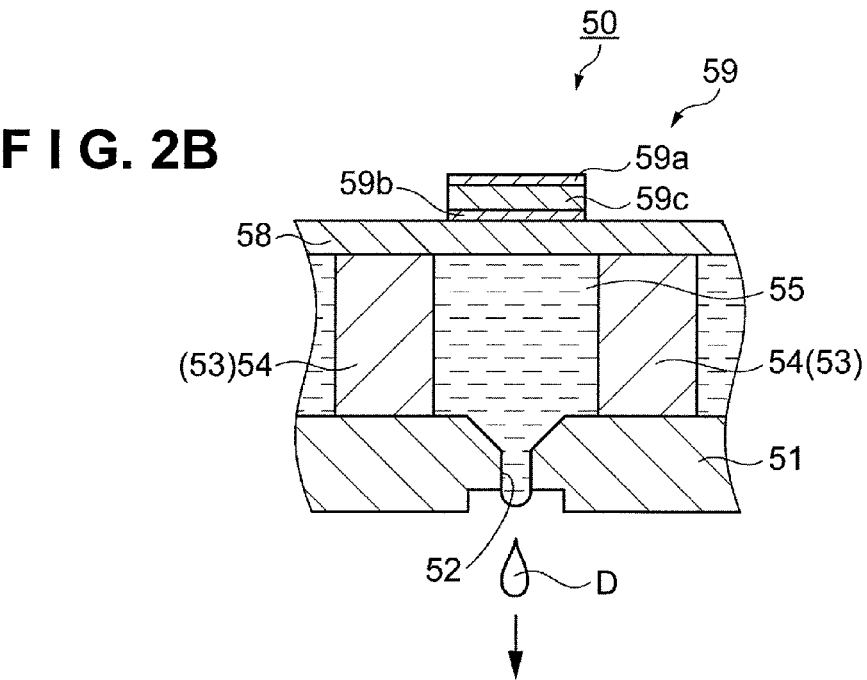

FIGS. 2A and 2B are schematic views showing the structure of the droplet discharge heads. FIG. 2A is a schematic exploded perspective view, and FIG. 2B is a sectional view showing the structure of the nozzle part. As shown in FIGS. 2A and 2B, the droplet discharge heads 50 have a structure in which a nozzle plate 51 having a plurality of nozzles 52 from which droplets D are discharged; a cavity plate 53 having barriers 54 for partitioning cavities 55 with which the plurality of nozzles 52 communicates; and an oscillation plate 58 having transducers 59 as energy generation units that correspond to the cavities 55 are layered in sequence and joined together.

The cavity plate 53 has the barriers 54 for partitioning the cavities 55 with which the nozzles 52 communicate, and has channels 56, 57 for filling the liquid material into the cavities 55. The channel 57 is between the nozzle plate 51 and the oscillation plate 58, and the space thus formed serves as a reservoir in which the liquid material is stored.

The liquid material is fed through a conduit from the liquid material feeding mechanism and through a feeding hole 58a provided to the oscillation plate 58, and is stored in the reservoir. The liquid material is then filled into the cavities 55 through the channels 56.

As shown in FIG. 2B, the transducers 59 are piezoelectric elements composed of a piezo element 59c and a pair of electrodes 59a, 59b that sandwich the piezo element 59c. A drive voltage pulse is applied to the pair of electrodes 59a, 59b from the outside, whereby the bonded oscillation plate 58 is caused to change shape. The volume of the cavities 55 divided by the barriers 54 thereby increases, and the liquid material is drawn into the cavities 55 from the reservoir. When application of the drive voltage pulse is ended, the oscillation plate 58 returns to the original state and presses on the filled liquid material. This structure thereby enables the liquid material to be discharged as droplets D from the nozzles 52. The discharging of the liquid material can be controlled for each of the nozzles 52 by controlling the drive voltage pulse that is applied to the piezo element 59c.

The droplet discharge heads 50 are not limited to being provided with piezoelectric elements (piezo elements). The droplet discharge heads 50 may be provided with an electromechanical conversion element for displacing the oscillation plate 58 through electrostatic adsorption, or an electrothermal conversion element for heating the liquid material and discharging the liquid material from the nozzles 52 as droplets D.

Figures 3A, 3B:
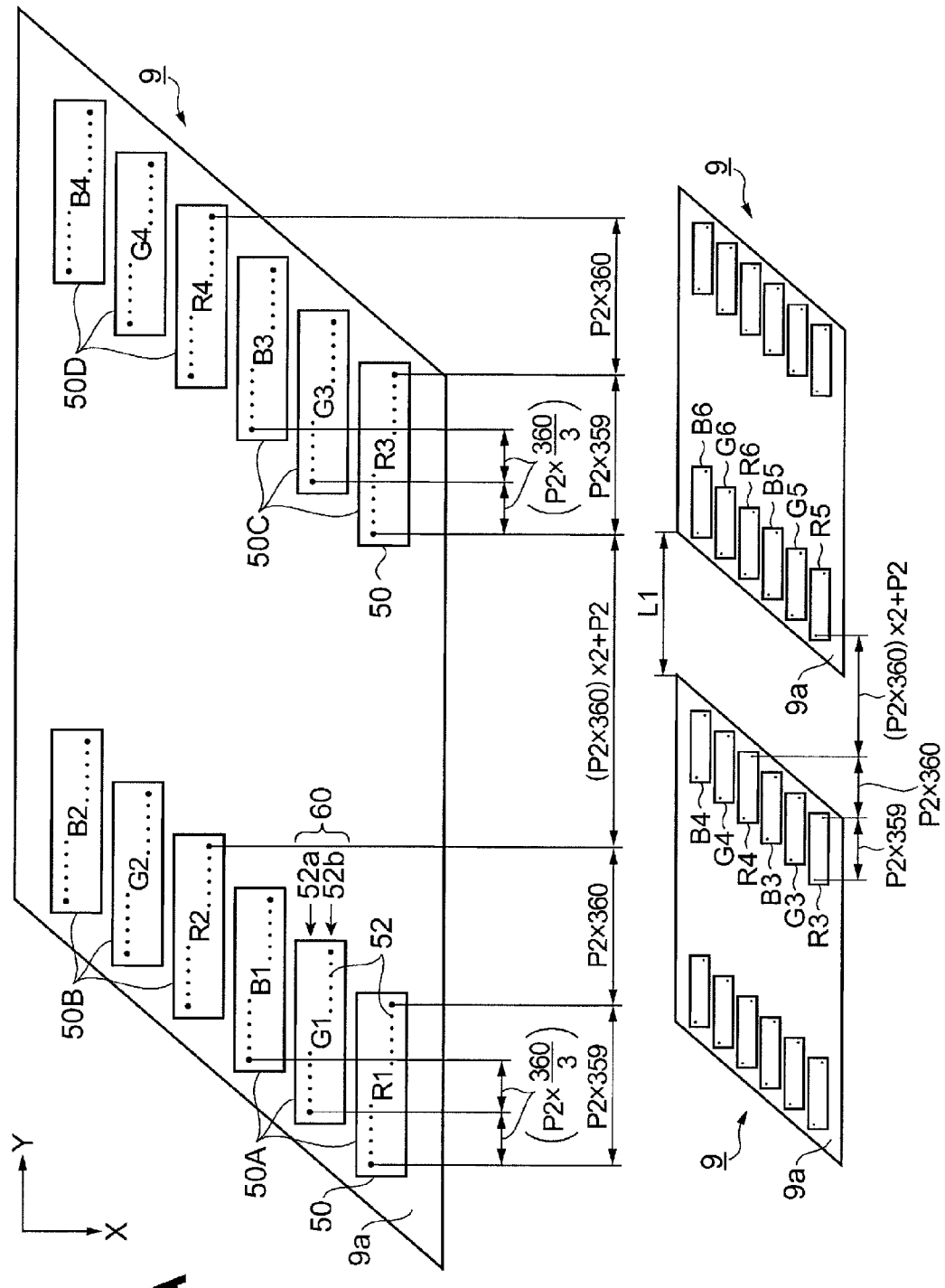
FIGS. 3A and 3B are schematic plan views showing the arrangement of the droplet discharge heads in the head unit.

FIGS. 3A and 3B are schematic plan views showing the arrangement of the droplet discharge heads in the head unit. Specifically, FIG. 3A is a view from the side facing the setting table 5, and FIG. 3B is a schematic plan view showing a case in which there is a plurality of arranged head units.

As shown in FIG. 3A, four head groups 50A, 50B, 50C, 50D in which a single group is composed of three droplet discharge heads 50 that discharge different types of the liquid material are arranged two groups apiece in the head plate 9a in the primary scanning direction (X-axis direction) as a first direction and the secondary scanning direction (Y-axis direction) as a second direction. The droplet discharge heads 50 have two nozzle rows 52a, 52b in which 180 nozzles 52 are arranged at a substantially equal interval P1 (about 140 μm).

The nozzle rows 52a and the nozzle rows 52b are provided so as to be offset from each other substantially half the equal interval P1 in the secondary scanning direction. Specifically, as viewed from the primary scanning direction, 360 nozzles 52 are arranged at a nozzle pitch P2 (about 70 μm). A row of 360 nozzles 52 will be referred to hereinafter as a nozzle row 60.

In the head groups 50A and 50B, the droplet discharge heads 50 are arranged so that the nozzle rows 60 thereof are offset in the secondary scanning direction by one-third the entire length thereof (P2×360). As viewed from the primary scanning direction, the droplet discharge heads 50 (e.g., head R1 and head R2) that discharge the same type of liquid material are arranged so that the nozzle rows 60 are continuous in the secondary scanning direction at the nozzle pitch P2. The same arrangement of the droplet discharge heads 50 is adopted in the head groups 50C, 50D. Furthermore, the interval between the nozzle rows 60 of the droplet discharge heads 50 (e.g., head R2 and head R3) that discharge the same type of liquid material positioned closest together in the head groups 50B and 50C as viewed from the primary scanning direction is (P2×360)×2+P2.

As shown in FIG. 3B, according to the size of the motherboard W, when a plurality of head units 9 is arranged in the secondary scanning direction, the interval L1 between two adjacent head plates 9a is set so that the interval between the nozzle rows 60 of a plurality of droplet discharge heads 50 (e.g., head R4 and head R5) that discharges the same type of liquid material positioned closest to each other as viewed from the primary scanning direction is (P2×360)×2+P2.

When primary scanning in the X-axis direction, and secondary scanning for moving in the Y-axis direction in the interval (P2×360)×2+P2 are performed using such a head unit 9, three different types of the liquid material can be discharged in a drawing range that is continuous in the secondary scanning direction.

Figure 4:
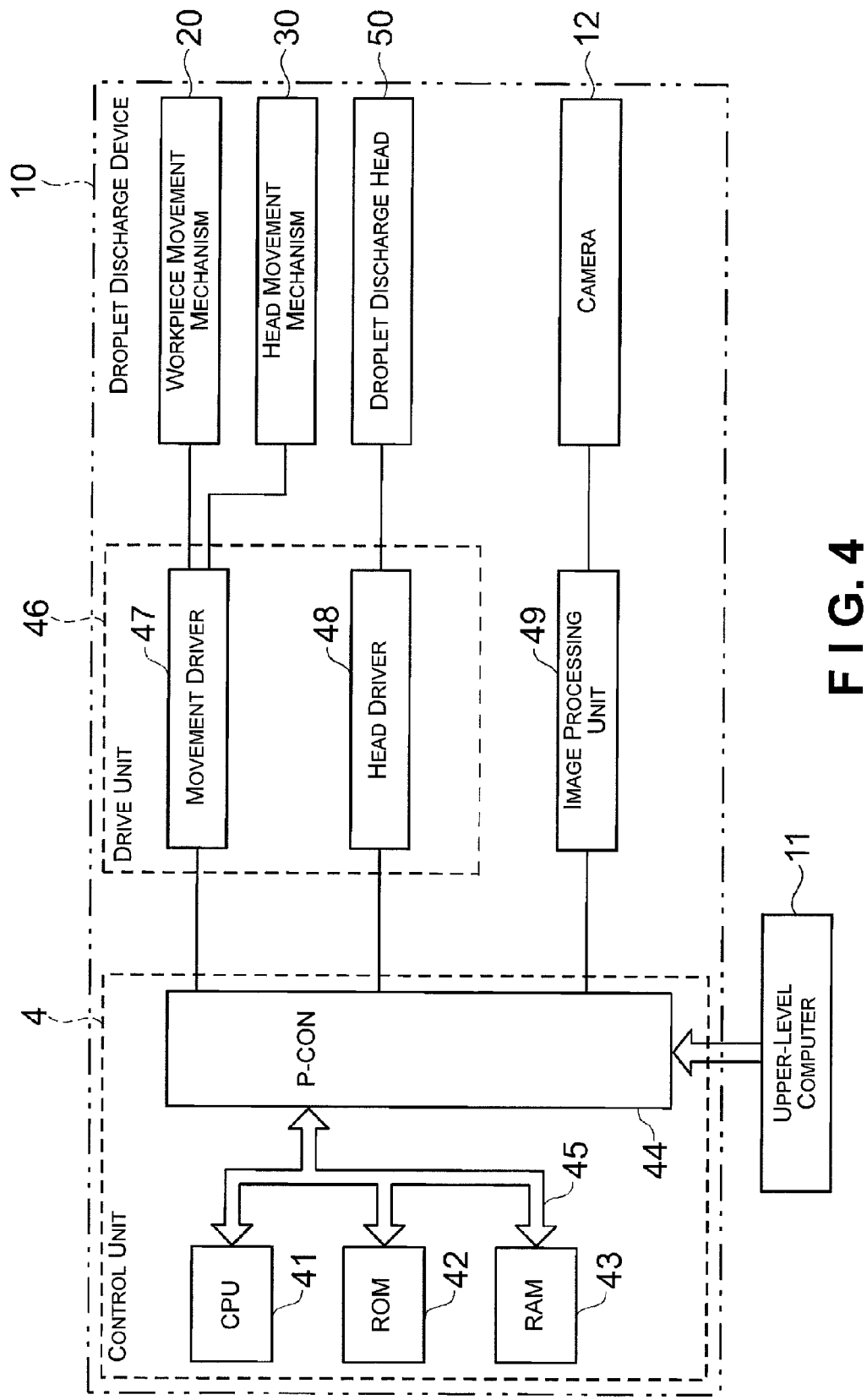
FIG. 4 is a block diagram showing the control system of the droplet discharge device.

The control system of the droplet discharge device 10 will next be described. FIG. 4 is a block diagram showing the control system of the droplet discharge device. The control system of the droplet discharge device 10 is provided with a drive unit 46 having various types of drivers for driving the droplet discharge heads 50, the workpiece movement mechanism 20, the head movement mechanism 30, and other components; and a control unit 4 for controlling the droplet discharge device 10 as well as the drive unit 46. The control system is also provided with an image processing unit 49 to which a camera 12 is connected.

The drive unit 46 is provided with a movement driver 47 for performing drive control of the linear monitors of the workpiece movement mechanism 20 and the head movement mechanism 30, respectively; a head driver 48 for performing discharge control of the droplet discharge heads 50; and a maintenance driver (not shown) for performing drive control of the maintenance units of the maintenance mechanism.

The control unit 4 is provided with a CPU 41, ROM 42, RAM 43, and a P-CON 44 that are connected to each other via a bus 45. An upper-level computer 11 is connected to the P-CON 44. The ROM 42 has a control program region for storing a control program or the like proceed by the CPU 41, and a control data region for storing control data and the like for performing drawing operations, function-restoring processing, and the like.

The RAM 43 has a draw data storage part for storing draw data for drawing on the motherboard W, a position data storage part for storing position data of the motherboard W and the droplet discharge heads 50 (actually, the nozzle rows 52a, 52b), and various other storage parts, and is used as a region for various types of operations for control processing. The image processing unit 49 and the various drivers and the like of the drive unit 46 are connected to the P-CON 44, and a logical circuit for assisting in the functions of the CPU 41 and handling interface signals with peripheral circuits is formed and incorporated in the P-CON 44. The P-CON 44 therefore inputs various types of commands and the like from the upper-level computer 11 to the bus 45 with or without modification, and outputs the data or control signal outputted from the CPU 41 and other components to the bus 45 to the drive unit 46 with or without modification in conjunction with the CPU 41.

The CPU 41 controls the droplet discharge device 10 as a whole by inputting various types of detection signals, various types of commands, various types of data, and the like via the P-CON 44, and processing the various types of data and the like in the RAM 43, and then outputting various types of control signals to the drive unit 46 and other components via the P-CON 44 in accordance with a control program in the ROM 42. For example, the CPU 41 controls the droplet discharge heads 50, the workpiece movement mechanism 20, and the head movement mechanism 30, positions the droplet discharge heads 50 and the motherboard W so as to face each other, and performs discharge and drawing of the droplets D of the liquid material on the motherboard W from the plurality of nozzles 52 of the droplet discharge heads 50 in synchronization with the relative movement of the droplet discharge heads 50 and the motherboard W. In this case, discharging of the liquid material in synchronization with movement of the motherboard W in the X-axis direction is referred to as primary scanning, and movement of the head unit 9 in which the plurality of droplet discharge heads 50 is mounted in the Y-axis direction is referred to as secondary scanning. The droplet discharge device 10 of the present embodiment can discharge and draw the liquid material through multiple repetitions of a combination of primary scanning and secondary scanning. Primary scanning is not limited to movement of the motherboard W in one direction with respect to the droplet discharge heads 50, and the motherboard W may also be moved back and forth.

The CPU 41 drives the head movement mechanism 30 so that the movement stage 33 is moved in the Y-axis direction, and the mounted camera 12 is positioned facing the motherboard W. The surface of the motherboard W on which the droplets D are landed is observed and imaged. Position information whereby the camera 12 is moved with respect to the motherboard W for observation is generated by the upper-level computer 11 and inputted in advance as observation coordinates to the RAM 43. The image processing unit 49 is connected to the upper-level computer 11 via the P-CON 44. The upper-level computer 11 can display the image information captured by the camera 12 and converted by the image processing unit 49 in a display unit (not shown), and an operator can confirm the landing state of the droplets D.

The image processing unit 49 converts the captured image to bitmap data as image information. The CPU 41 can compute the landing position or landing diameter of the droplets D from the bitmap data. The computed results are written to the RAM 43. Details of this process will be described in the liquid material drawing method hereinafter.

Figure 5:
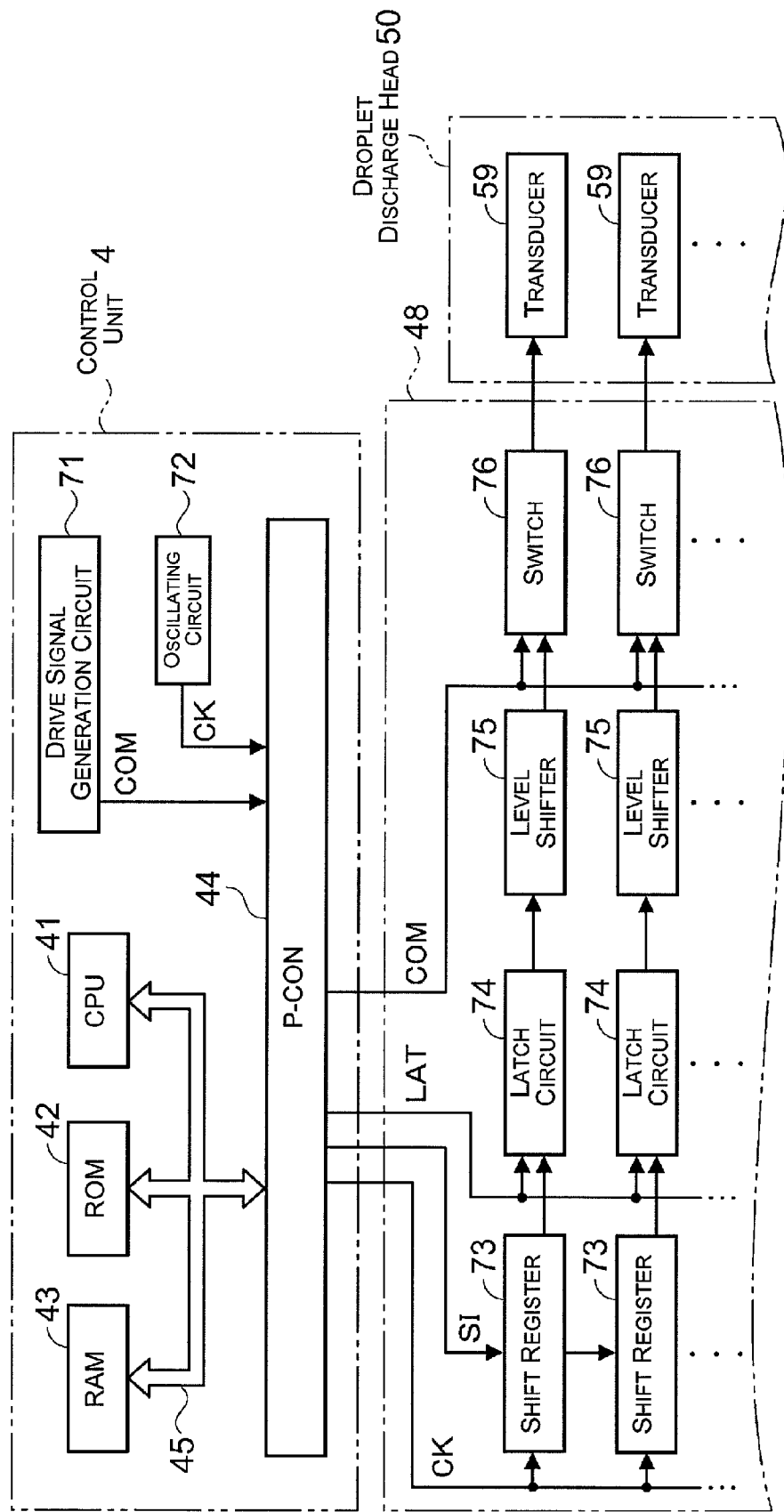
FIG. 5 is a block diagram showing the details of discharge control.

The method for controlling discharge in the droplet discharge heads will next be described with reference to FIGS. 5 and 6. FIG. 5 is a block diagram showing the details of discharge control. As shown in FIG. 5, the control unit 4 is provided with the CPU 41, the ROM 42, the RAM 43, the P-CON 44, and the bus 45, as well as with a drive signal generation circuit 71 for generating a drive signal (COM), and an oscillating circuit 72 for generating a clock signal (CK).

The head driver 48 is provided with shift registers 73, latch circuits 74, level shifters 75, and switches 76, and is configured so as to be capable of selectively applying the drive signal (COM) to the transducers 59 that correspond to the nozzles 52 of the droplet discharge heads 50.

The upper-level computer 11 transmits arrangement information as control data for arranging the droplets D as dots on the surface of a drawing object to the control unit 4. The arrangement information includes the relative discharge positions of the plurality of nozzles 52 with respect to the motherboard W, the selection of nozzles 52 for discharge of droplets D, the number of discharges of droplets D, and the drive conditions when the droplets D are discharged. The control unit 4 generates a nozzle data signal (SI) or a drive signal (COM) for each nozzle row unit in the following manner based on the items of control data.

Specifically, the CPU 41 decodes the control data and generates nozzle data that include ON/OFF information for each nozzle. The drive signal generation circuit 71 performs setting and generation of the drive signal (COM) based on the nozzle data computed by the CPU 41.

The nozzle data signal (SI) in which the nozzle data are converted to a serial signal is synchronized with the clock signal (CK) and transmitted to the shift registers 73, and the ON/OFF information of each of the nozzles 52 is stored. A latch signal (LAT) generated by the CPU 41 is inputted to the latch circuits 74, whereby the nozzle data are latched. The latched nozzle data are amplified by the level shifters 75, and a prescribed voltage is fed to the switches 76 when the nozzle data indicate "ON." When the nozzle data indicate "OFF," a voltage is not fed to the switches 76.

While the voltage increased by the level shifters 75 is being fed to the switches 76, the drive signal (COM) is applied to the transducers 59, and droplets D are discharged from the nozzles 52 (see FIGS. 2A and 2B).

Figure 6:
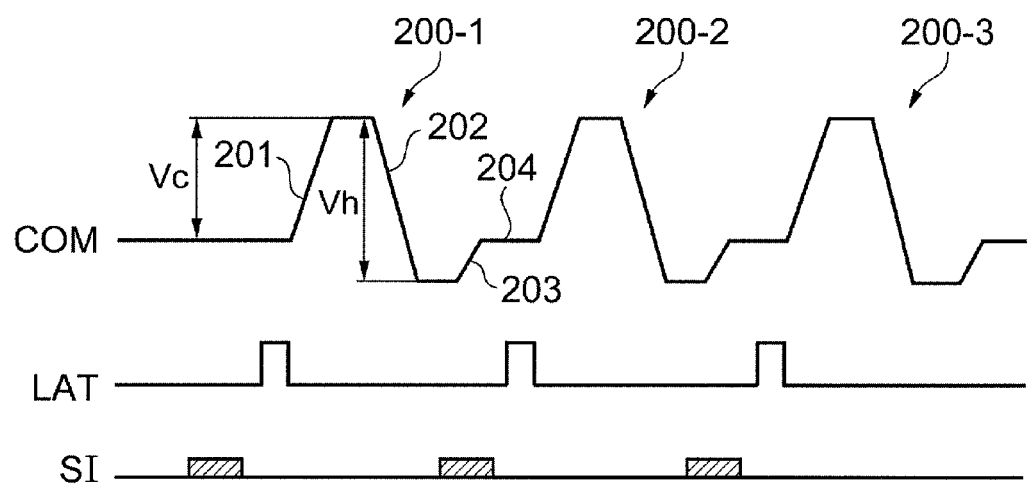
FIG. 6 is a diagram showing the control signals for discharge control.

Such discharge control is performed periodically as shown in FIG. 6 in synchronization with the relative movement (primary scanning) of the head unit 9 and the motherboard W.

FIG. 6 is a diagram showing the control signals for discharge control. In the drive signal (COM) as shown in FIG. 6, a sequence of pulse groups 200-1, 200-2, . . . that have an electrical discharge pulse 201, a charging pulse 202, and an electrical discharge pulse 203 are connected by an intermediate potential 204. A single droplet D is discharged by a single pulse group in the manner described below.

Specifically, the potential level is increased, and the liquid material is drawn into the cavities 55 (see FIG. 2B) by the electrical discharge pulse 201. The liquid material inside the cavities 55 is then rapidly pressurized and expelled in the form of droplets (discharge) from the nozzles 52 by the sharp charging pulse 202. Lastly, the reduced potential level is returned to the intermediate potential 204 by the electrical discharge pulse 203, and the pressure oscillation (natural oscillation) generated inside the cavities 55 by the charging pulse 202 is cancelled.

The voltage components Vc, Vh, the time component (pulse slope, connection gap between pulses, and the like), and the like in the drive signal (COM) are parameters that have a significant bearing on the discharged amount, the discharge stability, and other factors, and these parameters require appropriate advance design. In this case, the period of the latch signal (LAT) is set to 20 kHz with consideration for the specific frequency characteristics of the droplet discharge heads 50. The speed (in this case, the movement speed of the setting table 5 in the X-axis direction) of relative movement of the droplet discharge heads 50 and the substrate W during primary scanning is set to 200 mm/second. Accordingly, when the discharge resolution is calculated by dividing the relative movement speed by the latch period, the unit of discharge resolution is 10 μm. Specifically, the discharge timing can be set for each nozzle 52 in units of discharge resolution. In other words, the droplets D can be arranged at a discharge interval in units of 10 μm on the surface of the motherboard W. When the timing at which the latch pulse is generated is based on a pulse that is outputted by an encoder (not shown) provided to the movement stage 22, the discharge timing can also be controlled in units of movement resolution.

The droplet discharge device 10 makes it possible for the liquid material to be discharged as droplets D with varying discharge amounts and discharge timings by each nozzle 52 or each nozzle row 52*a*, 52*b* of the droplet discharge heads 50. For example, when the relative positioning of the workpiece and the droplet discharge heads 50 (essentially, the nozzle rows 52*a*, 52*b*) deviates from the design positioning in primary scanning, the discharged droplets D1 and outside the desired landing position. Deviation in the primary scanning direction in such landing position deviation can be corrected by varying the discharge timing for each nozzle row 52*a*, 52*b*. In other words, correction can be performed for each droplet discharge head 50. Causes of landing position deviation based on the structure of the droplet discharge device 10 include positional accuracy of the droplet discharge heads 50 in the head unit 9, positional accuracy of the head unit 9 with respect to the carriage 8, movement precision in the Y-axis direction of the movement stage 32 to which the carriage 8 is provided, movement precision in the X-axis direction of the setting table 5, and other factors. Since landing position deviation due to flight deflection of the droplets D discharged from the nozzles 52 does not necessarily always occur in one direction, another solution is desired from the perspective of enhancing the landing position accuracy. For example, a method may be adopted whereby nozzles 52 in which flight deflection occurs are not selected for discharge among the plurality of nozzles 52.

Consequently, the droplet discharge device 10 is capable of placing the head unit 9 opposite the motherboard W through the use of the head movement mechanism 30, and discharging the liquid material in the form of droplets D with high positional accuracy from the total of twelve droplet discharge heads 50 that are provided to the head unit 9, in synchronization with primary scanning by the workpiece movement mechanism 20.

The color filter manufacturing method that uses the droplet discharge device 10 of the present embodiment will next be described. The liquid crystal display device as an electro-optical device having a color filter will first be briefly described. FIG. 7 is a schematic exploded perspective view showing the structure of the liquid crystal display device.

As shown in FIG. 7, the liquid crystal display device 500 is provided with a TFT (Thin Film Transistor) transmissive liquid crystal display panel 520 and an illumination device 516 for illuminating the liquid crystal display panel 520. The liquid crystal display panel 520 is provided with an opposing substrate 501 having color filters 505 that have a color layer; an element substrate 508 having TFT elements 511 in which one of three terminals is connected to a pixel electrode 510; and liquid crystals (not shown) that are held between the opposing substrate 501 and the element substrate 508. An upper polarizer 514 and a lower polarizer 515 for polarizing the transmitted light are provided to the surfaces of the opposing substrate 501 and the element substrate 508 that form the outside of the liquid crystal display panel 520.

The opposing substrate 501 is composed of transparent glass or another material, and is provided with banks 504 as barrier parts for partitioning the color regions as a plurality of pixel regions into a matrix on the surfaces that sandwich the liquid crystal, and three colors (RGB) of color layers 505R, 505G, 505B in the plurality of partitioned color regions. The banks 504 are composed of lower-layer banks 502 referred to as a black matrix that are composed of Cr or another metal or oxide film thereof that has light-blocking properties, and upper-layer banks 503 composed of an organic compound that are formed on (downward in the drawing) the lower-layer banks 502. The opposing substrate 501 is provided with an overcoat layer (OC layer) 506 as a planarizing layer for covering the color layers 505R, 505G, 505B that are partitioned by the bank 504 and the bank 504; and an opposing electrode 507 composed of ITO (Indium Tin Oxide) or another transparent conductive film that is formed so as to cover the OC layer 506. The color filters 505 are manufactured using the color filter manufacturing method described hereinafter.

The element substrate 508 is also composed of a glass or other transparent material, and has pixel electrodes 510 formed in a matrix via an insulation film 509 on the side on which the liquid crystals are sandwiched, and a plurality of TFT elements 511 formed so as to correspond to the pixel electrodes 510. Of the three terminals of the TFT elements 511, the other two terminals that are not connected to the pixel electrodes 510 are connected to scanning lines 512 and data lines 513 that are arranged in a lattice so as to surround and insulate the pixel electrodes 510 from each other.

The illumination device 516 may be any illumination device that uses a white LED, EL, cold cathode tube, or the like as a light source, and that has a structure provided with a light-guide plate, a diffusion plate, a reflection plate, or the like that is capable of emitting the light from the light source to the liquid crystal display panel 520.

Orientation films for aligning the liquid crystal molecules in one direction are formed on the surfaces of the opposing substrate 501 and the element substrate 508 that sandwich the liquid crystal, but the orientation films are not shown in the drawing. The upper and lower polarizers 514, 515 may also have phase difference films or other optically functional films that are used for such purposes as improving the viewing angle dependency. The liquid crystal display panel 520 is not limited to having TFT elements as the active elements, and may have a TFD (Thin Film Diode) element. When the liquid crystal display panel 520 is provided with a color filter on at least one of the substrates, the liquid crystal display panel 520 may be a passive liquid crystal display device in which the electrodes constituting the pixels are arranged so as to intersect each other.

The abovementioned liquid crystal display device 500 is manufactured by a process in which a structure formed by bonding the motherboard W in which the opposing substrate 501 provided with color filters 505 that has a plurality of partitions formed in a matrix therein with a motherboard in which the element substrate 508 has a plurality of partitions formed in a matrix therein in the same manner so as to sandwich the liquid crystal, and cutting the assembly in a prescribed position to obtain the liquid crystal display device.

FIG. 8 is a schematic plan view showing the motherboard. As shown in FIG. 8, a region in which color filters 505 (see FIG. 7) are arranged in a single liquid crystal display device 500, for example, is designated as a single chip region, and nine chip regions C1 through C9 are arranged in a matrix on the motherboard W. Color regions A of the same color are arranged in stripes in the Y-axis direction in each chip region C1 through C9.

Color Filter Manufacturing Method

FIGS. 9A through 9E are schematic sectional views showing the color filter manufacturing process. The method for manufacturing the color filters 505 having color layers 505R, 505G, 505B of three colors such as described above is provided with a step for forming banks 504 on the surface of the opposing substrate 501, and a step for treating the surfaces of the color regions A that are partitioned by the banks 504. The manufacturing method is also provided with a drawing step for discharging and drawing droplets D of three types (three colors) of the liquid material that includes a color layer forming material in the surface-treated color regions A using the droplet discharge device 10, and a film formation step as a curing step for drying the drawn liquid material to form color layers 505R, 505G, 505B. The manufacturing method is furthermore provided with a step for forming the OC layer 506 so as to cover the banks 504 and the color layers 505R, 505G, 505B, and a step for forming the transparent opposing electrode 507 that is composed of ITO so as to cover the OC layer 506.

Figure 9A:
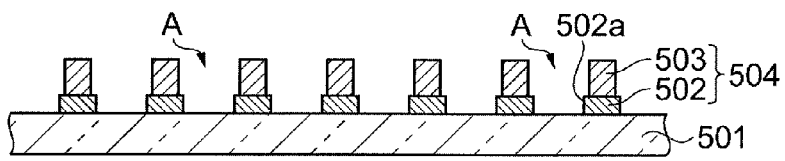
FIGS. 9A through 9E are schematic sectional views showing the color filter manufacturing method.

In the step for forming the banks 504, the lower-layer banks 502 as the black matrix are first formed on the opposing substrate 501, as shown in FIG. 9A. The material used to form the lower-layer banks 502 may be Cr, Ni, Al, or another non-transparent metal, or an oxide or other compound of these metals, for example. The lower-layer banks 502 are formed by a method in which a film composed of the above-mentioned material is formed on the opposing substrate 501 using vapor deposition or sputtering. The film thickness may be set according to a material having an appointed film thickness that allows light-blocking properties to be maintained. For example, a thickness of 100 to 200 nm is preferred when the material is Cr. The film in areas other than the portions that correspond to the open parts 502a (see FIG. 7) is covered by a resist according to a photolithography method, and the film is etched using oxygen or another etching solution that corresponds to the abovementioned material. The lower-layer banks 502 having open parts 502a are thereby formed.

The upper-layer banks 503 are then formed on the lower-layer banks 502. An acrylic-based photosensitive resin material is used as the material for forming the upper-layer banks 503. The photosensitive resin material preferably has light-blocking properties. In an example of the method for forming the upper-layer banks 503, a photosensitive resin material is applied by roll coating or spin coating to the surface of the opposing substrate 501 on which the lower-layer banks 502 are formed, and the photosensitive resin material is dried to from a photosensitive resin layer having a thickness of about 2 µm. A mask provided with open parts that are sized according to the color regions A is then positioned opposite the opposing substrate 501 in a prescribed position, and exposure/development are performed to form the upper-layer banks 503. The banks 504 for partitioning the plurality of color regions A in a matrix are thereby formed on the opposing substrate 501. The process then proceeds to the surface treatment step.

In the surface treatment step, plasma treatment using $O_2$ as the treatment gas, and plasma treatment using a fluorine-based gas as the treatment gas are performed. Specifically, the color regions A are subjected to a lyophilizing treatment, and the surfaces of the upper-layer banks 503 (including the wall surfaces) composed of the photosensitive resin are then subjected to a fluid repellant treatment. The process then proceeds to the drawing step.

Figure 9B:
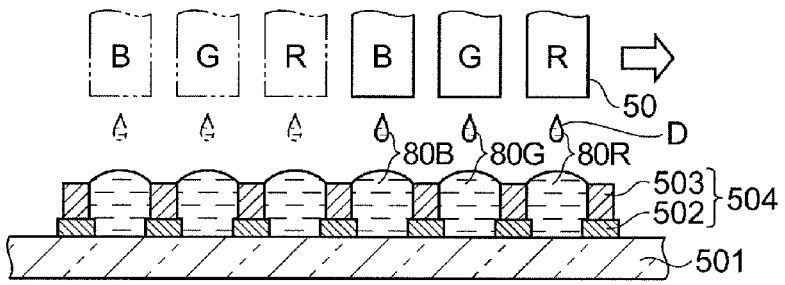

In the drawing step, droplets of the liquid bodies 80R, 80G, 80B in the corresponding colors for the surface-treated color regions A are discharged as shown in FIG. 9B. The liquid material 80R includes R (red) color-filter-forming material, the liquid material 80G includes G (green) color-filter-forming material, and the liquid material 80B includes B (blue) color-filter-forming material. The liquid bodies 80R, 80G, 80B are filled into the droplet discharge heads 50 of the droplet discharge device 10. Primary scanning is then performed in which the head unit 9 and the motherboard W are moved relative to each other based on the arrangement information for arranging the droplets D as dots in the color regions A, and the liquid bodies 80R, 80G, 80B are discharged from the droplet discharge heads 50 to the color regions A. Since the liquid bodies 80R, 80G, 80B are discharged using the liquid material drawing method described hereinafter, the necessary quantity is provided according to the surface area of the color regions A.

Figure 9C:
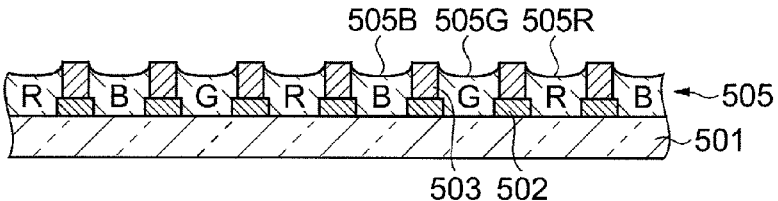

In the subsequent film formation step, the discharged and drawn liquid bodies 80R, 80G, 80B are dried at once to remove the solvent component, and films of the color layers 505R, 505G, 505B are formed, as shown in FIG. 9C. Vacuum drying or another method that is capable of uniformly drying the solvent components is preferred as the drying method. The process then proceeds to the OC layer formation step.

Figure 9D:
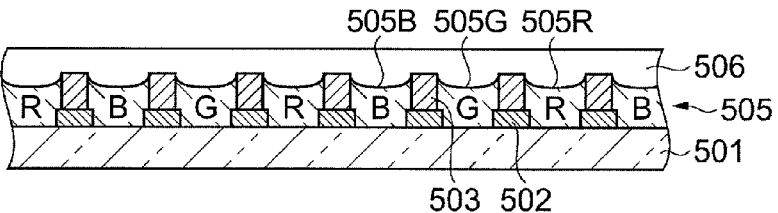

In the OC layer formation step, the OC layer 506 is formed so as to cover the upper-layer banks 503 and the color layers 505R, 505G, 505B, as shown in FIG. 9D. A transparent acrylic-based resin material may be used as the OC layer 506. Formation methods include spin coating, offset printing, and other methods. The OC layer 506 is provided to mitigate irregularities in the surface of the opposing substrate 501 on which the color layers 505R, 505G, 505B are formed, and to flatten the opposing electrode 507 that is subsequently formed as a film on the surface of the opposing substrate 501. A thin film of $SiO_2$ or the like may also be formed on the OC layer 506 to maintain adhesion with the opposing electrode 507. The process then proceeds to the transparent electrode formation step.

Figure 9E:
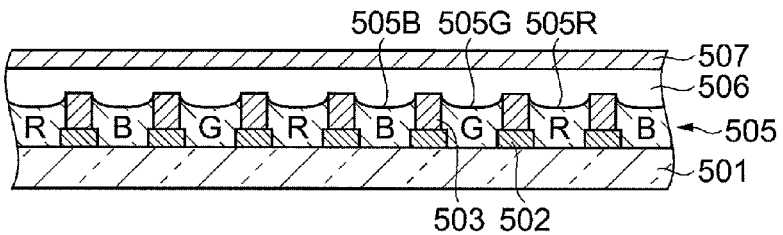

In the transparent electrode formation step, a film of ITO or another transparent electrode material is formed in a vacuum using sputtering or vapor deposition, and the opposing electrode 507 is formed on the entire surface so as to cover the OC layer 506, as shown in FIG. 9E.

FIGS. 10A and 10B are schematic plan views showing the relative arrangement of the workpiece and the head unit in the drawing step. A case is shown in which two head units 9 are arranged according to the size of the motherboard W. The width in the Y-axis direction of the rectangles that indicate each droplet discharge head 50 in the drawings indicates a draw width Iw that corresponds to the entire length of the effective nozzle row 60 of each droplet discharge head 50.

As shown in FIG. 10A, the control unit 4 drives the linear motor of the head movement mechanism 30 so as to move the movement stage 32 and position the head unit 9 so as to face the motherboard W. During primary scanning, head B4 of head group 50D determines the position at which the ends of all the drawing regions of the motherboard W in the Y-axis can be drawn. The interval L1 of the adjacent head unit 9 is adjusted by the head movement mechanism 30 so as to coincide with (P2×360)×2+P2.

The control unit 4 drives the linear motor of the workpiece movement mechanism 20 so that the motherboard W mounted on the setting table 5 is moved in the X-axis direction (primary scanning direction), and different types of the liquid material are discharged from the droplet discharge heads 50 in synchronization with the movement of the motherboard W. When the drawing width that can be drawn by head B3 and head B4 in the first cycle is width $Eb_1$, the liquid bodies 80B that correspond to the color regions A aligned in the B row are discharged in a divided drawing region having width $Eb_1$ at the interval of (P2×360)×2+P2 in the secondary scanning direction. The other different types of the liquid bodies 80R, 80G are discharged in the same manner.

Then, as shown in FIG. 10B, the control unit 4 performs a new-line operation for moving the head units 9 a distance equal to (P2×360)×2+P2 in the secondary scanning direction. The drawing operation through primary scanning is also performed. Width $Eb_1$=width $Eb_2$=(P2×360)×2+P2 when the drawing width that can be drawn by the droplet discharge heads 50 that include head B3 and head B4 is width $Eb_2$. Therefore, the different liquid bodies 80R, 80G, 80B can be discharged in all the drawing regions of the motherboard W by performing at least two primary scans. Regions that cannot be drawn by head G4 and head R4 occur at the ends in the Y-axis direction of all the drawing regions of the motherboard W. The control unit 4 drives the head movement mechanism 30 so that the drawing operations through secondary scanning and primary scanning for moving the head units 9 are repeated. The draw width of the plurality of droplet discharge heads 50 is thereby used to full potential to discharge the different types of the liquid bodies 80R, 80G, 80B without bias in the color regions A of all the drawing regions.

In the abovementioned drawing step, the liquid bodies 80R, 80G, 80B of three colors are discharged at substantially the same time. In such a drawing method, the necessary quantities of the liquid bodies 80R, 80G, 80B must be landed as droplets D with high positional accuracy in the corresponding color regions A. For example, when the droplets D discharged from the nozzles 52 do not land in the originally intended color region A, and a different liquid material lands in the color region A, different types of the liquid material mix together, and so-called mixing occurs. Such a discharge defect affects the product yield during manufacture of the color filters 505. In the liquid crystal display device 500, pixels that have color layers 505R, 505G, 505B in which discharge irregularity or mixing occurs have irregular color and other pixel defects. The liquid material drawing method of the present invention was developed in view of such a problem.

Liquid Material Drawing Method

The liquid material drawing method of the present embodiment will next be described based on FIGS. 11 through 14. FIG. 11 is a flowchart showing the liquid material drawing method.

As shown in FIG. 11, the liquid material drawing method of the present embodiment is provided with a first discharging step (step S1) for discharging droplets D for landing observation, a landing observation step (step S2) for observing a color region A in which the droplets D are discharged, an arrangement information correction step (step S3) for correcting arrangement information for arranging the droplets D as dots in the color regions A based on the obtained landing position information of the droplets D, and a second discharging step (step S4) for discharging the droplets D based on the corrected arrangement information.

Figure 12A:
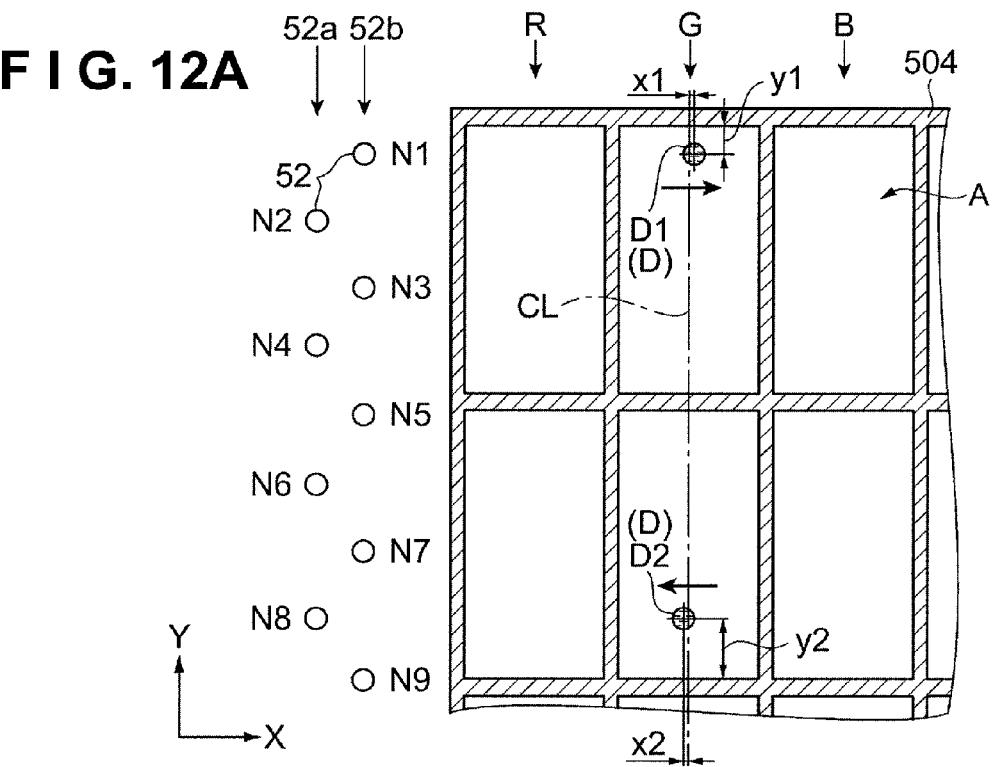
FIGS. 12A and 12B are schematic plan views showing the arrangement of droplets in the first discharging step.
Figure 12B:
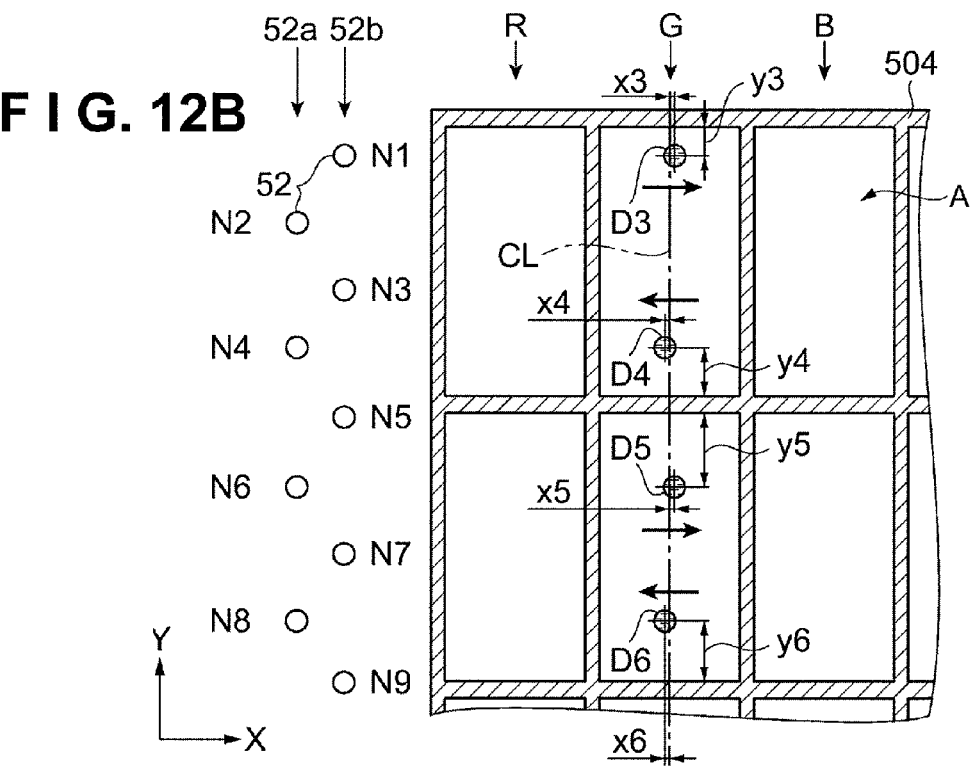

FIGS. 12A and 12B are schematic plan views showing the arrangement of droplets in the first discharging step. In step S1 of FIG. 11, a single droplet D of the liquid material 80G is discharged in each green (G) color region A as shown in FIG. 12A. Discharge control is performed at this time so that the droplets D land on an imaginary center line CL parallel to the Y-axis direction in the color regions A of the same color. Since the droplets D therefore do not land along the X-axis direction, deterioration of the landing shape due to contact with the banks 504 can be reduced.

The droplets D are preferably landed as far apart as possible in forward movement and reverse movement of the primary scanning in order to accurately obtain the droplet landing position information. Therefore, the most distant nozzles N1 and N8 are selected in the nozzle rows 52a, 52b that coincide with the adjacent color regions A, and droplet D1 and droplet D2 are discharged in forward movement and reverse movement, respectively, in the primary scan. In this case, the head unit 9 is moved back and forth without starting a new line in one cycle of primary scanning. It is apparent that the selection of nozzles 52 for discharging the droplets D1, D2 varies according to the nozzle pitch of the nozzles 52 or the size of the color regions A partitioned by the banks 504. The arrangement of the droplets D1 and D2 is generated in advance as bitmap data using the upper-level computer 11.

As shown in FIG. 12B, two droplets D may be discharged on the imaginary center line CL for each color region A of the same color. In this case, the distant nozzles N1 and N4, and N6 and N8 are selected in the nozzle rows 52a, 52b that coincide with the adjacent color regions A, and droplets D3, D4, D5 and droplet D6 are discharged in forward movement and reverse movement in the primary scan. According to this configuration, it is sufficient for at least one color region A to be observed in the landing observation step. The process then proceeds to step S2.

Step S2 of FIG. 11 is the landing observation step. In step S2, the control unit 4 drives the linear motor of the head movement mechanism 30 to move the movement stage 33 so that the camera 12 faces the color region A in which the droplets D were discharged. An image is captured of at least the color regions A in which droplets D1 and D2 were landed as shown in FIG. 12A. The image processing unit 49 converts the captured image to bitmap data. The CPU 41 calculates the imaginary center line CL from the bitmap of the banks 504. A landing center as the landing position is calculated from the bitmap indicating the landed shape of the droplet D1. The distance x1 in the X-axis direction between the calculated imaginary center line CL and the landing center is computed. The distance y1 from the inner wall of the bank 504 to the landing center of the droplet D1 is computed. The distances x2 and y2 are computed in the same manner for droplet D2. The computation results are stored in the RAM 43.

The same procedure applied in the case of the two droplets D that were discharged into the color regions A as shown in FIG. 12B. The distances x3 and y3 are calculated for droplet D3. The distances x4 and y4 are calculated for droplet D4. The distances x5 and y5 are calculated for droplet D5. The distances x6 and y6 are calculated for droplet D6.

The arrangement of droplets D1, D2, D3, D4, D5, and D6 in FIGS. 12A and 12B indicates the positioning of the nozzles 52 that discharged the droplets D1, D2, D3, D4, D5, and D6 relative to the motherboard W. Furthermore, since discharge is divided among forward movement and reverse movement in the primary scanning, the actual landing position accuracy is also indicated. In actual practice, since the landed droplets spread in substantially circular fashion in the color regions A as viewed from above, the landing center can be derived from image processing even though time elapses before the image is captured.

In this case, in the first discharging step of step S1, droplets D of the liquid material 80G are discharged in the green (G) color regions A. As shown in FIG. 10, twelve droplet discharge heads 50 are arranged in the head unit 9. Accordingly, in order to correct the relative positioning of the droplet discharge heads 50 and the motherboard W in primary scanning based on the landing position information, it is preferable to calculate the landing position of the droplets D in the divided drawing region having width Eb, discharged and drawn in at least one cycle of primary scanning. Productivity can be reduced when landings are observed over a wide range. Therefore, the description will focus on which droplets D are landed in the color regions A. FIG. 13 is a schematic plan view showing the landing observation method.

As shown in FIG. 13, in the landing observation step of the present embodiment, a color region A is observed with which a droplet discharge head 50 for discharging the liquid material 80G coincides that is positioned centrally in the primary scanning direction in a single head group. More specifically, a color region A is observed with which a nozzle 52 positioned substantially in the center of the nozzle rows 52a, 52b coincides in primary scanning in head G4 of head group 50D, for example. The landing position information of droplets D1 and D2 can thereby be efficiently obtained. The same applies for the other head groups 50A, 50B, 50C. The coordinates of the color regions A for which landing observation is performed in accordance with each head group are also determined in advance when a plurality of head units 9 is used. Such observation coordinates can be generated based on the arrangement information of each droplet discharge head 50 (actually, the nozzle rows 52a, 52b) in primary scanning using the upper-level computer I 1. The process then proceeds to step S3.

Step S3 of FIG. 11 is the arrangement information correction step. In step S3, the relative positioning of the head unit 9 and the droplet discharge heads 50 (nozzle rows 52a, 52b) with respect to the motherboard W is corrected in the arrangement information for arranging the necessary quantity of the liquid material as dots having a prescribed number of droplets D in the color regions A based on the distances x, y calculated in step S2.

Correction methods include a method for correcting the relative discharge initiation position of the head unit 9 and the motherboard W in primary scanning. In the second discharging step, since two head units 9 start a new line, correction of the discharge initiation position in the secondary scanning direction is also included. These methods use a so-called hard approach for offsetting the discharge initiation position using the workpiece movement mechanism 20 and the head movement mechanism 30.

Furthermore, a soft method for varying the discharge timing at which the transducers 59 as energy generation units are driven is included as a method for correcting landing position deviation in the primary scanning direction, in addition to an offsetting method such as the one described above. The landing position deviation can thereby be corrected for each droplet discharge head 50 or each nozzle row 52a, 52b mounted in the head unit 9.

The deviation in the primary scanning direction can be used as a correction value by performing statistical processing using the unmodified distance x. Deviation in the secondary scanning direction is computed based on the position information of the nozzles 52 in the arrangement information. Accordingly, use of the distance y from the inner wall of the bank 504 is not limiting, and the distance from the boundary line of a color region A partitioned by the banks 504 may be calculated from the bitmap as image information. The effects of shape precision of the banks 504 are thereby reduced. The process then proceeds to step S4.

Figure 14A:
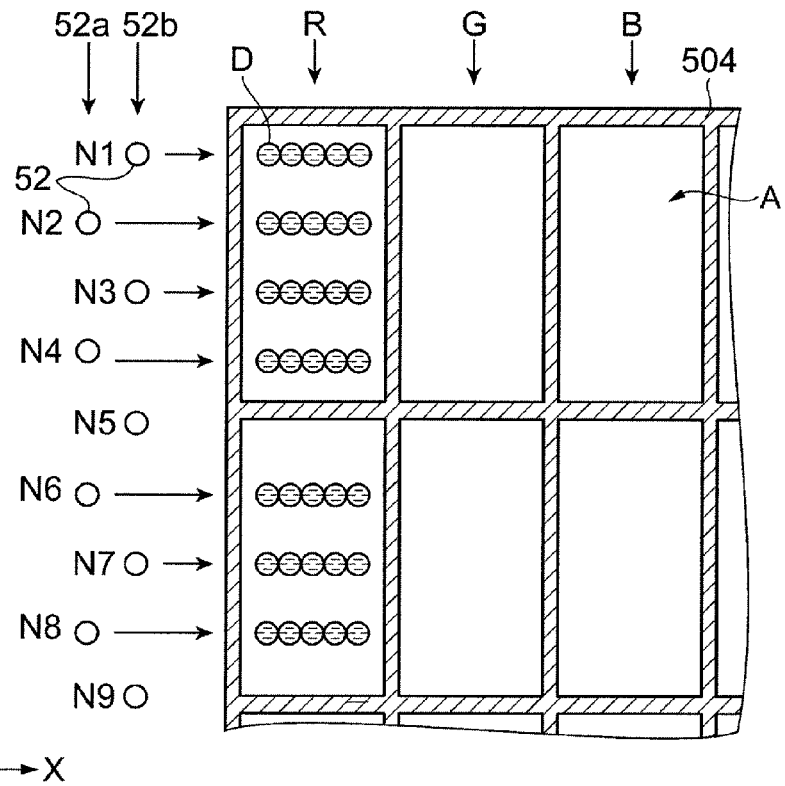
FIGS. 14A and 14B are schematic views showing the arrangement of droplets in the second discharging step.
Figure 14B:
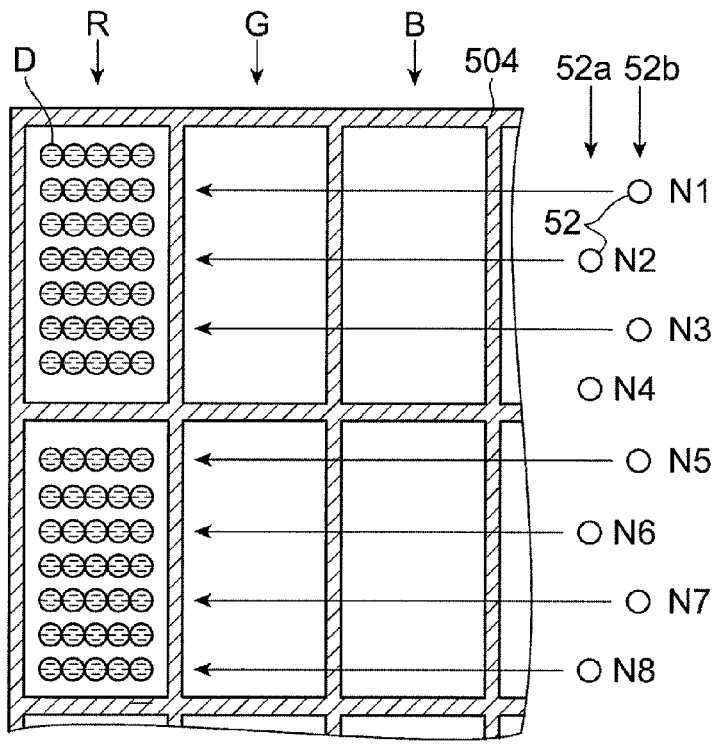

Step S4 in FIG. 11 is the second discharging step. FIGS. 14A and 14B are schematic diagrams showing the arrangement of droplets in the second discharging step. In step S4, the nozzles N1, N2, N3, N4, N6, N7, N8 that coincide with the red (R) color regions A are selected among the nozzle rows 52a, 52b, for example, and five discharges for each nozzle are performed in forward movement in primary scanning of the head unit 9 and the motherboard W, as shown in FIG. 14A. The nozzles N1, N2, N3, N5, N6, N7, N8 that coincide with the red (R) color regions A are then selected among the nozzle rows 52a, 52b, and five discharges for each nozzle are performed in reverse movement in primary scanning of the motherboard W and the head unit 9 offset in the secondary scanning direction, as shown in FIG. 14B. A total of 35 droplets D are thereby landed in the color regions A of the same color. The same process is applied for the green (G) color regions A and the blue (B) color regions A. Such an arrangement of droplets D is based on the arrangement information corrected in step S3.

As shown in FIG. 12A, since one droplet is first discharged in the green (G) color regions A in the first discharging step of step S1, the total number of droplets is 36, but irregular discharge is unlikely to occur. When two droplets D are first discharged in the color regions A as shown in FIG. 12B, or when the necessary quantity of the liquid material is to be strictly applied, the number of discharges in the arrangement information is changed in advance in the second discharging step so that the number of droplets D discharged in the first discharging step is subtracted in advance from the prescribed number of droplets D discharged in the color regions A.

According to such a liquid material drawing method, the droplets D are discharged based on corrected arrangement information in the second discharging step, and the droplets D can therefore be landed with good positional accuracy in the color regions A. The necessary quantity of the liquid material can also be stably applied as droplets D in each color region A.

Such a liquid material drawing method is preferably employed at the start of operation of the droplet discharge device 10, after a droplet discharge head 50 or the head unit 9 is replaced, or at another time. Once the arrangement information is corrected, the second discharging step may be repeated thereafter based on the corrected arrangement information.

Furthermore, it is apparent that other nozzles 52 may be selected when missing discharge, flight deflection, or other discharge defects occur in the nozzles 52 that discharge the droplets D used for landing observation in the first discharging step.

The effects of the first embodiment are described below.

(1) In the liquid material drawing method of the first embodiment, a single droplet D used for landing observation is discharged onto the imaginary center line CL of a green (G) color region A in the first discharging step. The distance x between the imaginary center line CL and the landing center of the droplet D, and the distance y between the bank 504 and the landing center of the droplet D are computed from the image information of the color region A obtained in the landing observation step. In the arrangement information correction step, the relative positioning of the motherboard W and the nozzle rows 52a, 52b (nozzle row 60) as the plurality of nozzles is corrected in the arrangement information based on the distances x, y. In the second discharging step, the droplets D are discharged based on the corrected arrangement information. Consequently, the droplets D can be landed in the color regions A with good positional accuracy. The droplets D are also discharged direction onto the motherboard W, and waste of the liquid material can therefore be prevented in comparison to a case in which the landing position information is obtained by discharging droplets D onto a discharge object other than the motherboard W.

(2) In the liquid material drawing method of the first embodiment, the droplets D for landing observation are discharged in each color region A through forward movement and reverse movement of primary scanning in the first discharging step. Consequently, landing position information of the droplets D can be obtained in accordance with forward movement and with reverse movement. Since the arrangement information is corrected based on this landing position information, the droplets D can be landed with high positional accuracy in the second discharging step.

(3) In the liquid material drawing method of the first embodiment, the arrangement information can be corrected so that a prescribed number of droplets D obtained by subtracting the number of droplets D discharged in the first discharging step are discharged in the corresponding color regions A in the second discharging step. The necessary quantity of the liquid material can therefore be applied in the color regions A without waste.

(4) The method for manufacturing the color filter 505 of the abovementioned embodiment uses the liquid material drawing method of the first embodiment to discharge the liquid bodies 80R, 80G, 80B of three colors. Consequently, the necessary quantity of the liquid material can be landed in the form of droplets D in the color regions A with good positional accuracy and without waste, and a color filter 505 having the desired optical characteristics can be manufactured. When the opposing substrate 501 provided with the color filters 505 is used, a liquid crystal display device 500 having attractive display quality can be obtained.

Second Embodiment

Referring now to FIGS. 15, 16A through 16F, a method for manufacturing an organic EL element having a luminescent layer in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the method for manufacturing an organic EL element having a luminescent layer in accordance with the second embodiment, the liquid material drawing method of the first embodiment as explained above are applied.

Figure 15:
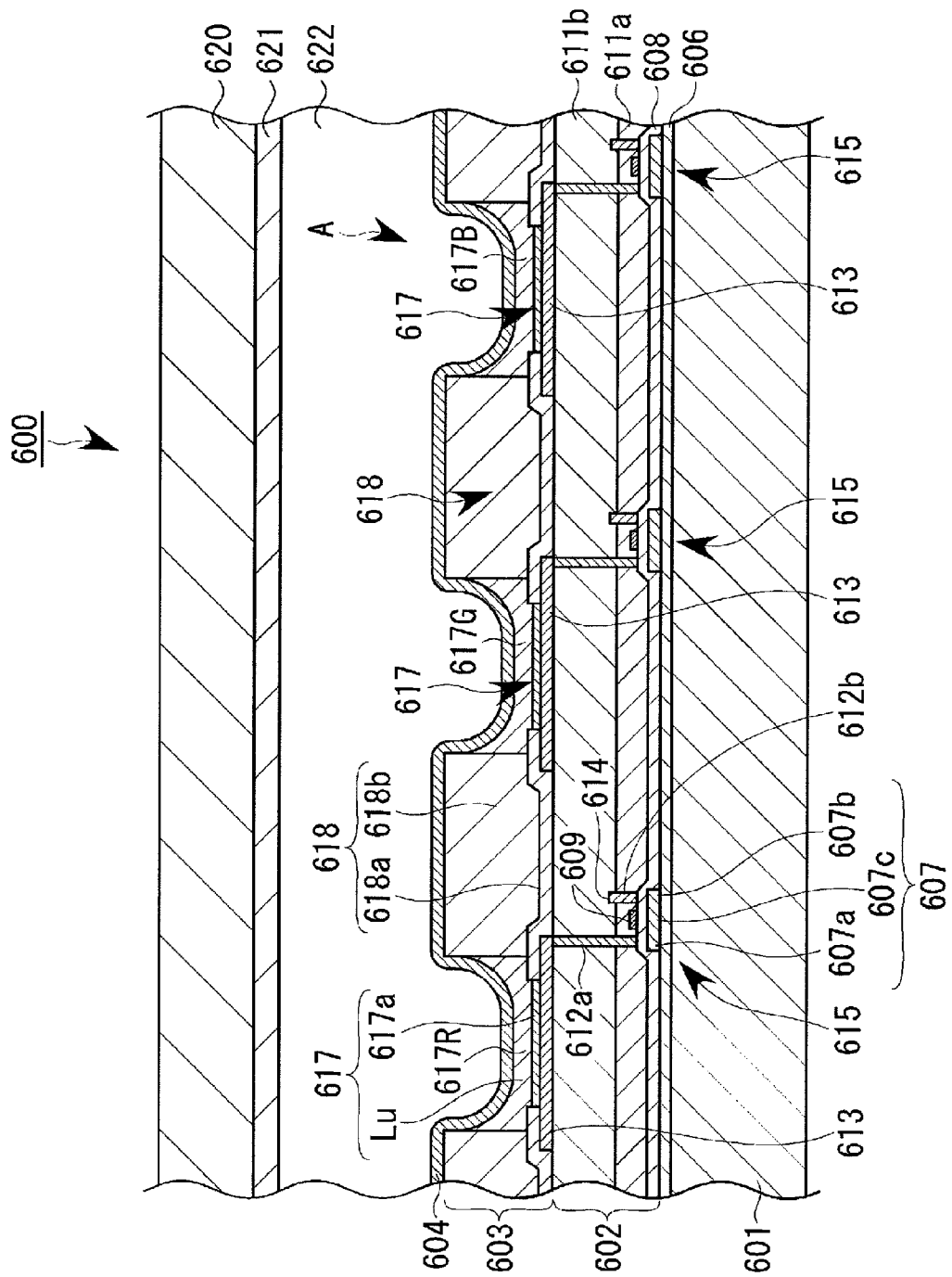
FIG. 15 is a schematic sectional view showing the relevant parts of the structure of the organic EL display device.

The organic EL display device having the organic EL element will first be briefly described. FIG. 15 is a schematic sectional view showing the relevant parts of the structure of the organic EL display device. As shown in FIG. 15, the organic EL display device 600 is provided with an element substrate 601 that has a luminescent element part 603 as the organic EL element; and a sealing substrate 620 that is sealed at a distance from the element substrate 601 and a space 622. The element substrate 601 is also provided with a circuit element part 602 on the element substrate 601, and the luminescent element part 603 is formed over the circuit element part 602 and driven by the circuit element part 602. Luminescent layers 617R, 617G, 617B of three colors are formed in luminescent layer formation regions A as pixel regions in a striped pattern in the luminescent element part 603. In the element substrate 601, three luminescent layer formation regions A that correspond to color layers 617R, 617G, 617B of three colors form a single set of picture elements, and the picture elements are arranged in a matrix on the circuit element part 602 of the element substrate 601. In the organic EL display device 600, the light emitted from the luminescent element part 603 is emitted toward the element substrate 601.

The sealing substrate 620 is composed of glass or metal, and is bonded to the element substrate 601 via a sealing resin. A getter agent 621 is affixed to the sealed inside surface. The getter agent 621 absorbs water or oxygen that enters the space 622 between the element substrate 601 and the sealing substrate 620 and prevents the luminescent element part 603 from being degraded by the contaminating water or oxygen. The getter agent 621 may also be omitted.

The element substrate 601 has a plurality of luminescent layer formation regions A as pixel regions on the circuit element part 602, and is provided with barrier parts 618 for partitioning the plurality of luminescent layer formation regions A; electrodes 613 formed in the plurality of luminescent layer formation regions A; and positive hole implantation/transport layers 617a that are layered on the electrodes 613. The luminescent element part 603 is also provided that has luminescent layers 617R, 617G, 617B formed by applying the three types of the liquid material that include a luminescent-layer-forming material in the plurality of luminescent layer formation regions A. The barrier parts 618 are composed of lower-layer banks 618a, and upper-layer banks 618b that essentially partition the luminescent layer formation regions A, wherein the lower-layer banks 618a are provided so as to protrude into the luminescent layer formation regions A, and the electrodes 613 and the luminescent layers 617R, 617G, 617B are formed by $SiO_2$ or another inorganic insulation material so as to prevent direct contact and electrical short circuiting with each other.

The element substrate 601 is composed of glass or another transparent substrate, for example, a base protective film 606 composed of a silicon oxide film is formed on the element substrate 601, and islands of semiconductor films 607 composed of polycrystalline silicon are formed on the base protective film 606. A source region 607a and a drain region 607b are formed by high-concentration P ion implantation in the semiconductor films 607. The portion into which P is not implanted is the channel region 607c. A transparent gate insulation film 608 for covering the base protective film 606 and the semiconductor films 607 is also formed, gate electrodes 609 composed of Al, Mo, Ta, Ti, W, or the like are formed on the gate insulation film 608, and a transparent first interlayer insulation film 611a and second interlayer insulation film 611b are formed on the gate electrodes 609 and the gate insulation film 608. The gate electrodes 609 are provided in positions that correspond to the channel regions 607c of the semiconductor films 607. Contact holes 612a, 612b that are connected to the source regions 607a and the drain regions 607b, respectively, of the semiconductor films 607 are also formed so as to penetrate through the first interlayer insulation film 611a and the second interlayer insulation film 611b. Transparent electrodes 613 composed of ITO (Indium Tin Oxide) are patterned in a prescribed shape and arranged (electrode formation step) on the second interlayer insulation film 611b, and the contact holes 612a on one side are connected to the electrodes 613. The other contact holes 612b are connected to power supply lines 614. Thin film transistors 615 for driving that are connected to the electrodes 613 are formed in the circuit element part 602 in this manner. Retention capacitors and thin film transistors for switching are also formed in the circuit element part 602, but these components are not shown in FIG. 17.

The luminescent element part 603 is provided with electrodes 613 as positive electrodes, positive hole implantation/transport layers 617a and the luminescent layers 617R, 617G, 617B (referred to generically as luminescent layers Lu) that are layered in sequence on the electrodes 613, and a negative electrode 604 that is layered so as to cover the upper-layer banks 618b and the luminescent layers Lu. A functional layer 617 in which luminescence is induced is composed of the positive hole implantation/transport layers 617a and the luminescent layers Lu. Using a transparent material to form the negative electrode 604, the sealing substrate 620, and the getter agent 621 enables the light generated from the direction of the sealing substrate 620 to be emitted.

The organic EL display device 600 has scanning lines (not shown) connected to the gate electrodes 609, and signal lines (not shown) connected to the source regions 607a, and when the thin film transistors (not shown) for switching are turned on by the scanning signal transmitted to the scanning lines, the potential of the signal lines at that time is maintained by retention capacitors, and the on/off state of the thin film transistors 615 for driving is determined according to the state of the retention capacitors. Electric current flows from the power supply lines 614 to the electrodes 613 via the channel regions 607c of the thin film transistors 615 for driving, and the electric current then flows to the negative electrode 604 via the positive hole implantation/transport layers 617a and the luminescent layers Lu. The luminescent layers Lu emit light according to the amount of flowing current. The organic EL display device 600 can display the desired characters or image through the light emission mechanism of the luminescent element part 603 thus configured.

Organic EL Element Manufacturing Method

The method for manufacturing a luminescent element part as the organic EL element of the present embodiment will next be described based on FIGS. 16A through 16F. FIGS. 16A through 16F are schematic sectional views showing the method for manufacturing the luminescent element part as the organic EL element. The circuit element part 602 formed on the element substrate 601 is not shown in FIGS. 16A through 16F.

The method for manufacturing the luminescent element part 603 of the present embodiment is provided with a step for forming the electrodes 613 in positions that correspond to the plurality of luminescent layer formation regions A of the element substrate 601, and a barrier part formation step for forming the lower-layer banks 618a so as to partially overlap on the electrodes 613, and forming the upper-layer banks 618b on the lower-layer banks 618a so as to essentially partition the luminescent layer formation regions A. The manufacturing method is also provided with a step for performing surface treatment of the luminescent layer formation regions A that are partitioned by the upper-layer banks 618b, a step for applying the liquid material that includes a positive hole implantation/transport layer forming material in the surface-treated luminescent layer formation regions A to draw the positive hole implantation/transport layers 617a by discharging, and a step for drying the discharged liquid material to form the positive hole implantation/transport layers 617a. The manufacturing method is also provided with a step for performing surface treatment of the luminescent layer formation regions A in which the positive hole implantation/transport layers 617a are formed, a drawing step for discharging and drawing three types of the liquid material that includes the luminescent layer forming material in the surface-treated luminescent layer formation regions A, and a curing step for drying the discharged three types of the liquid material to form the luminescent layers Lu. The manufacturing method is furthermore provided with a step for forming the negative electrode 604 so as to cover the upper-layer banks 618b and the luminescent layers Lu.

Figure 16A:
FIGS. 16A through 16F are schematic sectional views showing the method for manufacturing a luminescent element part as the organic EL element.

In the electrode (positive electrode) formation step, the electrodes 613 are formed in positions that correspond to the luminescent layer formation regions A of the element substrate 601 on which the circuit element part 602 is already formed, as shown in FIG. 16A. In an example of the formation method, a transparent electrode film is formed on the surface of the element substrate 601 by sputtering or vapor deposition in a vacuum using ITO or another transparent electrode material. A photolithography method is then used to leave only the necessary portion, and the electrodes 613 may be formed by etching. The element substrate 601 is covered in advance by a photoresist, and exposure/development are performed so as to open the regions for forming the electrodes 613. A transparent electrode film of ITO or the like may then be formed in the open parts, and the remaining photoresist may be removed. The process then proceeds to the bank formation step.

Figure 16B:
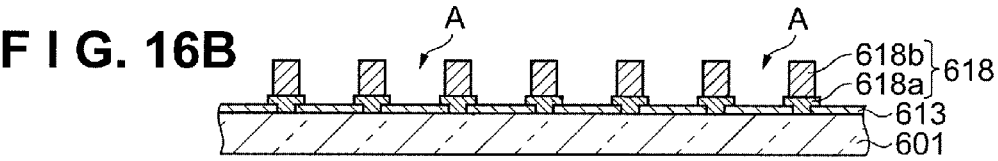

In the barrier part formation step, the lower-layer banks 618a are formed so as to cover portions of the plurality of electrodes 613 of the element substrate 601, as shown in FIG. 16B. The material used to form the lower-layer banks 618a is $SiO_2$ (silicon dioxide), which is an inorganic material having insulation properties. In an example of the method for forming the lower-layer banks 618a, the surfaces of the electrodes 613 are masked using a resist or the like so as to correspond to the subsequently formed luminescent layers Lu. The masked element substrate 601 is then placed in a vacuum device, and the lower-layer banks 618a are formed by sputtering or vacuum deposition using $SiO_2$ as the target or source material. The resist or other mask is subsequently peeled off. Since the lower-layer banks 618a are formed by $SiO_2$, adequate transparency is obtained when the film thickness thereof is 200 nm or less, and light emission is not inhibited even when the positive hole implantation/transport layers 617a and the luminescent layers Lu are subsequently layered.

The upper-layer banks 618b are then formed on the lower-layer banks 618a so as to essentially partition the luminescent layer formation regions A. The material used to form the upper-layer banks 618b is preferably a material that is durable with respect to the solvent of the three types of liquid material 100R, 100G, 100B that include the luminescent layer forming material described hereinafter, and a material that can be given a fluid-repellent treatment through the use of a plasma treatment using a fluorine-based gas as the treatment gas is preferred, e.g., an organic material such as an acrylic resin, an epoxy resin, a photosensitive polyimide, or the like. In an example of the method for forming the upper-layer banks 618b, the abovementioned photosensitive organic material is applied by roll coating or spin coating to the surface of the element substrate 601 on which the lower-layer banks 618a are formed, and the coating is dried to form a photosensitive resin layer having a thickness of about 2 µm. A mask provided with open parts whose size corresponds to the luminescent layer formation regions A is then placed against the element substrate 601 in a prescribed position, and exposure/development is performed, whereby the upper-layer banks 618b are formed. The barrier parts 618 having lower-layer banks 618a and upper-layer banks 618b are thereby formed. The process then proceeds to the surface treatment step.

In the step for treating the surfaces of the luminescent layer formation regions A, the surface of the element substrate 601 on which the barrier parts 618 are formed is first plasma treated using $O_2$ gas as the treatment gas. The surfaces of the electrodes 613, the protruding parts of the lower-layer banks 618a, and the surfaces (including the wall surfaces) of the upper-layer banks 618b are thereby activated and lyophilized. Plasma treatment is then performed using $CF_4$ or another fluorine-based gas as the treatment gas. The fluorine-based gas is thereby reacted with only the surfaces of the upper-layer banks 618b that are composed of the photosensitive resin as an organic material, and the surfaces are rendered fluid repellent. The process then proceeds to the positive hole implantation/transport layer formation step.

Figure 16C:
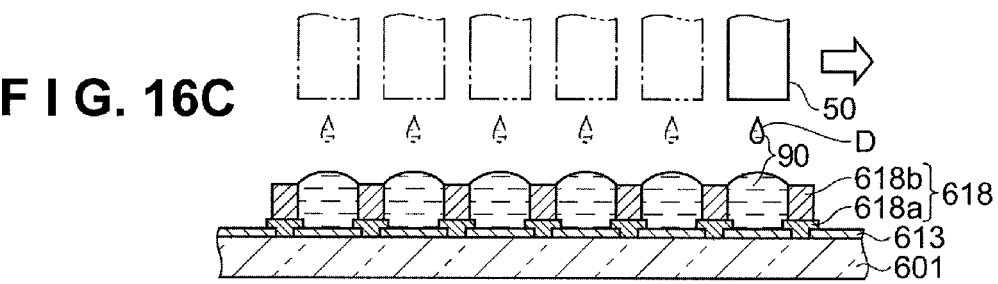

In the positive hole implantation/transport layer formation step, a liquid material 90 that includes a positive hole implantation/transport layer forming material is applied in the positive hole implantation/transport layer formation regions A, as shown in FIG. 16C. The drawing system 1 shown in FIG. 1 is used as the method for applying the liquid material 90. The liquid material 90 discharged from the droplet discharge heads 50 lands as droplets D on the electrodes 613 of the element substrate 601 and spreads. The necessary amount of the liquid material 90 according to the surface area of the luminescent layer formation regions A is discharged as droplets D. The process then proceeds to the drying/film-formation step.

In the drying/film-formation step, the solvent component of the liquid material 90 is dried and removed by heating the element substrate 601 by a lamp annealing method or other method, for example, and the positive hole implantation/transport layers 617a are formed in the regions partitioned by the lower-layer banks 618a of the electrodes 613. In the present embodiment, PEDOT (Polyethylene Dioxy Thiophene) is used as the positive hole implantation/transport layer forming material. Positive hole implantation/transport layers 617a composed of the same material are formed in the luminescent layer formation regions A in this case, but the material for forming the positive hole implantation/transport layers 617a may also be varied for each luminescent layer formation region A according to the subsequently formed luminescent layers Lu. The process then proceeds to the surface treatment step.

In the surface treatment step, when the positive hole implantation/transport layers 617a are formed using the abovementioned positive hole implantation/transport layer forming material. Since the surfaces thereof repel the three types of liquid material 100R, 100G, 100B, a surface treatment is again performed so that at least the areas within the luminescent layer formation regions A are lyophilic. The surface treatment is performed by a method in which the solvent used in the three types of liquid material 100R, 100G, 100B is applied and dried. A spraying method, a spin coating method, or other method may be used to apply the solvent. The process then proceeds to the luminescent layer Lu drawing step.

Figure 16D:
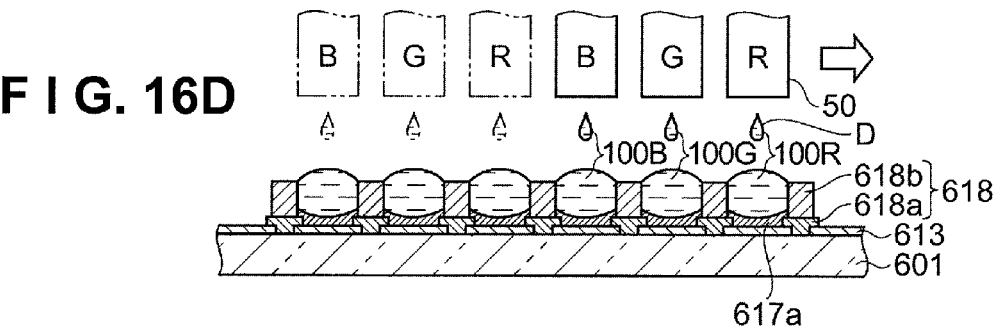

In the luminescent layer Lu drawing step, the droplet discharge device 10 is used to apply the three types of liquid material 100R, 100G, 100B including the luminescent layer forming material from the plurality of droplet discharge heads 50 to the plurality of luminescent layer formation regions A, as shown in FIG. 16D. The liquid material 100R includes a material for forming the luminescent layers 617R (red), the liquid material 100G includes a material for forming the luminescent layers 617G (green), and the liquid material 100B includes a material for forming the luminescent layers 617B (blue). The liquid bodies 100R, 100G, 100B are applied in the luminescent layer formation regions A using the liquid material drawing method of the first embodiment. In the second discharging step, each liquid material 100R, 100G, 100B is discharged using the corrected arrangement information. The necessary quantities of the liquid bodies 100R, 100G, 100B are thus discharged as droplets D in the corresponding luminescent layer formation regions A with good positional accuracy. The process then proceeds to the curing step.

Figure 16E:
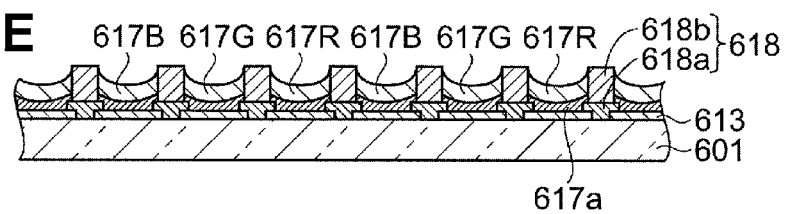

In the curing step, the solvent component of the discharged and drawn liquid bodies 100R, 100G, 100B is dried and removed, and films are formed so that the luminescent layers 617R, 617G, 617B are layered on the positive hole implantation/transport layers 617a of the luminescent layer formation regions A, as shown in FIG. 16E. A vacuum drying method that enables the solvent to be evaporated at a substantially constant rate is preferred as the method for drying the element substrate 601 on which the liquid bodies 100R, 100G, 100B are discharged and drawn. The process then proceeds to the negative electrode formation step.

Figure 16F:
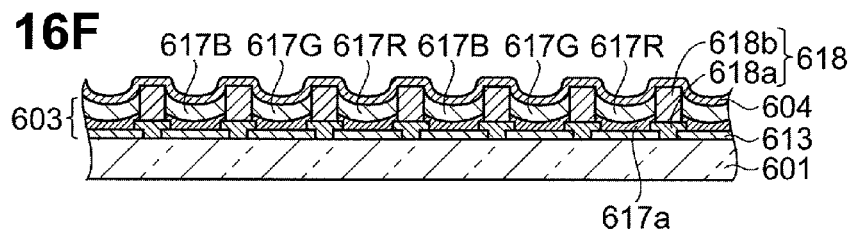

In the negative electrode formation step, the negative electrode 604 is formed so as to cover the upper-layer banks 618b and the luminescent layers 617R, 617G, 617B of the element substrate 601, as shown in FIG. 16F. A combination of Ca, Ba, Al, or another metal and LiF or another fluoride is preferably used as the material for forming the negative electrode 604. It is particularly preferred that a film of Ca, Ba, or LiF having a small work function be formed on the side towards the luminescent layers 617R, 617G, 617B, and that a film of Al or the like having a large work function be formed on the side facing away from the luminescent layers. A protective layer of $SiO_2$, SiN, or the like may also be layered on the negative electrode 604. The negative electrode 604 can thereby be prevented from oxidizing. Methods used to form the negative electrode 604 include vapor deposition, sputtering, CVD, and other methods. Vapor deposition is particularly preferred since this method makes it possible to prevent the luminescent layers 617R, 617G, 617B from being damaged by heat.

The element substrate 601 completed in this manner has luminescent layers 617R, 617G, 617B in which the necessary quantities of the liquid bodies 100R, 100G, 100B are applied in the corresponding luminescent layer formation regions A, and that have a substantially constant thickness after film formation.

The effects of the second embodiment are as described below.

(1) In the method for manufacturing the luminescent element part 603 according to the second embodiment, in the drawing step for the luminescent layers Lu, the necessary quantities of the liquid bodies 100R, 100G, 100B are discharged and drawn in the form of droplets D in the luminescent layer formation regions A of the element substrate 601 using the liquid material drawing method of the first embodiment. Consequently, a luminescent element part 603 can be manufactured that has luminescent layers 617R, 617G, 617B in which the film thickness after film formation is substantially constant.

(2) When the element substrate 601 is used that is manufactured using the method for manufacturing the luminescent element part 603 according to the second embodiment, the thickness of the luminescent layers 617R, 617G, 617B is substantially constant, and the resistance of each luminescent layer 617R, 617G, 617B is therefore substantially constant. Uneven luminescence, uneven luminance, and other defects due to unequal resistance in each luminescent layer 617R, 617G, 617B is thereby reduced when the drive voltage is applied by the circuit element part 602 to the luminescent element part 603 to generate light. Specifically, an organic EL display device 600 can be provided that has attractive display quality and a minimal occurrence of uneven luminescence, uneven luminance, and other defects.

The first and second embodiments of the present invention were described above, but various modifications may be added to the embodiments described above in ranges that do not depart from the intended scope of the present invention. Examples of modifications other than the abovementioned embodiments are described below.

MODIFICATION EXAMPLE 1

In the liquid material drawing method of the first embodiment, the liquid material 80G was discharged in the form of droplets D in the green (G) color regions A, but this configuration is not limiting. Droplets D for landing observation may be discharged in the color regions A of each color. The landing position can be properly corrected for each of the droplet discharge heads 50 that discharge the liquid bodies 80R, 80G, 80B.

MODIFICATION EXAMPLE 2

In the liquid material drawing method of the first embodiment, droplets D were discharged onto the imaginary center line CL parallel to the Y-axis direction of the color regions A in the first discharging step, but this configuration is not limiting. The landing position information may be obtained by computing the distance to the landing position of a droplet D for the X-axis direction and the Y-axis direction using a bank 504 as a reference for a landed droplet D.

MODIFICATION EXAMPLE 3

In the droplet discharge device 10 of the first embodiment, the arrangement of the droplet discharge heads 50 in the head unit 9 is not limited as such. For example, the nozzle rows 60 may be aligned so as to intersect with the primary scanning direction (X-axis direction).

MODIFICATION EXAMPLE 4

In the method for manufacturing a color filter 505 according to the first embodiment, the color layers are not limited to three colors. For example, the liquid material drawing method of the first embodiment can also be applied in a method for manufacturing a multicolor color filter in which other colors besides the three RGB colors are combined.

MODIFICATION EXAMPLE 5

In the method for manufacturing a color filter 505 according to the first embodiment, and the method for manufacturing a luminescent element part 603 as an organic EL element according to the second embodiment, the arrangement of the pixels is not limited as such. FIGS. 17A through 17C are schematic plan views showing arrangements of pixels. The liquid material drawing method of the first embodiment can be applied not only to the striped arrangement shown in FIG. 17A, but also to the mosaic arrangement shown in FIG. 17B or the delta arrangement shown in FIG. 17C.

MODIFICATION EXAMPLE 6

Device manufacturing methods in which the liquid material drawing method of the first embodiment can be applied are not limited to a color filter manufacturing method and an organic EL element manufacturing method. For example, the liquid material drawing method of the first embodiment can also be applied to a pixel electrode manufacturing method or a method for manufacturing a switching element or wiring part thereof that is formed in each pixel region partitioned on a substrate.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid material drawing method for discharging droplets of a liquid material including a functional material from a plurality of nozzles to a plurality of pixel regions that are partitioned by barrier parts in a first direction and a second direction orthogonal to the first direction on a workpiece in synchronization with relative movement of the workpiece and the nozzles in the first direction to form pixel formation elements with one cycle of the relative movement including a forward movement and a reverse movement, the liquid material drawing method comprising:

performing a first discharging step including
discharging a first droplet among the droplets from a first nozzle among the nozzles into a first pixel region among the pixel regions during the forward movement of the relative movement, and
discharging a second droplet among the droplets from a second nozzle among the nozzles into a second pixel region among the pixel regions during the reverse movement of the relative movement, the second pixel region being aligned with the first pixel region in the second direction,
two most distant nozzles among the nozzles corresponding to the first pixel region and the nozzles corresponding to the second pixel region being selected as the first and second nozzles;
observing and capturing an image of at least the first and second pixel regions in which the first and second droplets are discharged;
computing distances in the first direction and distances in the second direction between the barrier parts and landing positions of the first and second droplets in the image of the at least the first and second pixel regions;
correcting arrangement information including a relative positioning of the nozzles and the workpiece, which is used to arrange a prescribed number of the droplets as dots for each of the pixel regions, based on the distances in the first direction and the distances in the second direction; and performing a second discharging step in which the droplets are discharged based on the corrected arrangement information.

2. The liquid material drawing method according to claim 1, wherein the performing of the first discharging step includes discharging the first and second droplets on an imaginary center line parallel to the second direction in the first and second pixel regions, the imaginary center line being calculated based on the barrier parts in the image of the at least the first and second pixel regions, and the computing of the distances in the first direction includes calculating the imaginary center line based on the barrier parts in the image of the at least the first and second pixel regions, and computing the distances in the first direction between the imaginary center line and the landing positions of the first and second droplets.

3. The liquid material drawing method according to claim 1, wherein the observing of the at least the first and second pixel regions includes observing a divided drawing region including the pixel regions over which the nozzles scan through one cycle of the relative movement.

4. The liquid material drawing method according to claim 1, further comprising setting the prescribed number of the droplets as dots for each of the pixel regions in the arrangement information to a value obtained by subtracting a number of the droplets discharged during the first discharging step from a number obtained by converting to an amount of the liquid material required to be applied to the pixel regions into a number of droplets.

5. The liquid material drawing method according to claim 1, wherein the correcting of the arrangement information includes correcting a relative positioning of the workpiece and a plurality of nozzle rows arranged along a direction that intersects the direction of the relative movement based on the distances in the first direction and the distances in the second direction.

6. The liquid material drawing method according to claim 5, wherein the correcting of the arrangement information includes correcting a relative positioning of the workpiece and a plurality of discharge heads with each of the discharge heads having at least one of the nozzles rows based on the distances in the first direction and the distances in the second direction.

7. The liquid material drawing method according to claim 6, wherein the correcting of the arrangement information includes correcting a relative positioning of the workpiece and a plurality of head units to which the discharge heads are mounted based on the distances in the first direction and the distances in the second direction.

8. The liquid material drawing method according to claim 5, further comprising generating the arrangement information that includes a discharge timing of an energy generation unit that is used to discharge the droplets from each of the nozzles of the nozzles rows, the correcting of the arrangement information including varying the discharge timing of the nozzle rows in which landing position deviation occurs based on the distance in the first direction.

9. The liquid material drawing method according to claim 6, further comprising generating the arrangement information that includes a discharge timing of an energy generation unit that is used to discharge the droplets from each of the nozzles of the discharge heads, the correcting of the arrangement information including varying the discharge timing of the discharge heads in which landing position deviation occurs based on the distances in the first direction.

10. A color filter manufacturing method for manufacturing a color filter having at least three colors of color layers in the pixel regions partitioned on the substrate, the color filter manufacturing method comprising:

performing the liquid material drawing method according to claim 1 to discharge and draw at least three colors of the liquid material in the pixel regions with the liquid material including a color layer formation material; and curing the liquid material discharged and drawn on the substrate to form the at least three colors of the color layers.

11. The color filter manufacturing method according to claim 10, wherein the performing of the first discharging step includes discharging the first and second droplets of one of the three colors of the liquid material on an imaginary center line parallel to the second direction in the first and second pixel regions in which the one of the three colors of the liquid material is applied.

12. An organic electro-luminescent element manufacturing method for manufacturing an organic electro-luminescent element having at least a luminescent layer in the pixel regions partitioned on the substrate, the organic electro-luminescent manufacturing method comprising:

performing the liquid material drawing method according to claim 1 to discharge and draw the liquid material including a luminescent layer formation material in the pixel regions; and curing the liquid material discharged and drawn on the substrate to form the luminescent layer.

* * * * *